United States Patent
Powell

(10) Patent No.: US 10,713,642 B2
(45) Date of Patent: Jul. 14, 2020

(54) SYSTEM AND METHOD FOR SELECTING A PARKING SPACE USING A MOBILE DEVICE

(71) Applicant: DENSO International America, Inc., Southfield, MI (US)

(72) Inventor: Patrick Powell, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 810 days.

(21) Appl. No.: 15/229,411

(22) Filed: Aug. 5, 2016

(65) Prior Publication Data

US 2018/0039974 A1    Feb. 8, 2018

(51) Int. Cl.
*G06Q 10/02* (2012.01)
*G06Q 20/32* (2012.01)
(Continued)

(52) U.S. Cl.
CPC ......... *G06Q 20/3224* (2013.01); *G06F 16/29* (2019.01); *G06F 16/9537* (2019.01);
(Continued)

(58) Field of Classification Search
CPC ............... G06Q 20/3224; G06Q 20/28; G06Q 20/3223; G06Q 30/0284; G06F 16/9537;
(Continued)

(56) References Cited

U.S. PATENT DOCUMENTS 6,067,040 A    5/2000 Puglia
6,067,041 A    5/2000 Kaiser et al.
(Continued)

FOREIGN PATENT DOCUMENTS

| JP | 2004102645 A | 4/2004 |
|----|--------------|--------|
| JP | 2004340824 A | 12/2004 |
| JP | 2010244461 A | 10/2010 |

OTHER PUBLICATIONS

Blanco et al, Combination of UWB and HPS for indoor-outdoor vehicle localization, Oct. 1, 2007, 2007 IEEE International Symposium on Intelligent Signal Processing (pp. 1-6) (Year: 2007).*

*Primary Examiner* — Rupangini Singh
(74) *Attorney, Agent, or Firm* — Harness, Dickey & Pierce, P.L.C.

(57) ABSTRACT

A system and method are provided that include a communication system coupled to a vehicle, the communication system being configured to determine geospatial location data of the vehicle and transmit the geospatial location data to a server. At least one beacon communicates with the communication system and provides a reference location from which a part of the geospatial location data is determined. A mobile device is in communication with the server and is configured to receive geospatial location data of parked vehicles, compare the geospatial location data of the parked vehicles with geospatial reference location data of parking spaces in a parking lot to determine whether at least one parking space is available, and (communicate to the mobile device whether at least one parking space in the parking lot is available. The mobile device is configured to generate an output indicating whether at least one parking space is available.

11 Claims, 21 Drawing Sheets

(51) Int. Cl.

| | | |
|---|---|---|
| *G08G 1/14* | (2006.01) | |
| *G06Q 30/02* | (2012.01) | |
| *G06F 16/29* | (2019.01) | |
| *G06F 16/9537* | (2019.01) | |
| *G06Q 20/28* | (2012.01) | |
| *G07F 17/24* | (2006.01) | |
| *G07B 15/02* | (2011.01) | |

(52) U.S. Cl.
CPC ......... *G06Q 20/28* (2013.01); *G06Q 20/3223* (2013.01); *G06Q 30/0284* (2013.01); *G07F 17/24* (2013.01); *G08G 1/144* (2013.01); *G08G 1/146* (2013.01); *G07B 15/02* (2013.01)

(58) Field of Classification Search
CPC ......... G06F 16/29; G07F 17/24; G08G 1/144; G08G 1/146; G07B 15/02
See application file for complete search history.

(56) References Cited

U.S. PATENT DOCUMENTS

| | | | |
|---|---|---|---|
| 6,067,042 A | 5/2000 | Lee | |
| 6,067,043 A | 5/2000 | Faure et al. | |
| 6,067,044 A | 5/2000 | Whelan et al. | |
| 6,067,045 A | 5/2000 | Castelloe et al. | |
| 6,067,046 A | 5/2000 | Nichols | |
| 6,067,047 A | 5/2000 | Cook et al. | |
| 6,067,048 A | 5/2000 | Yamada | |
| 6,067,049 A | 5/2000 | Moriya | |
| 6,405,132 B1 | 6/2002 | Breed et al. | |
| 6,526,352 B1 | 2/2003 | Breed et al. | |
| 6,720,920 B2 | 4/2004 | Breed et al. | |
| 7,202,776 B2 | 4/2007 | Breed | |
| 7,774,231 B2 | 8/2010 | Pond et al. | |
| 7,893,848 B2 | 2/2011 | Chew | |
| 8,063,797 B1 * | 11/2011 | Sonnabend | G06K 9/00791 340/932.2 |
| 8,665,118 B1 * | 3/2014 | Woodard | G08G 1/144 340/932.2 |
| 10,176,524 B1 * | 1/2019 | Brandmaier | G06Q 40/08 |
| 2008/0235082 A1 * | 9/2008 | Zanotti | G07B 15/02 705/13 |
| 2013/0113936 A1 * | 5/2013 | Cohen | G07B 15/02 348/148 |
| 2014/0182519 A1 | 7/2014 | Tupin, Jr. | |
| 2015/0058101 A1 * | 2/2015 | Han | G07B 15/02 705/13 |
| 2016/0117866 A1 * | 4/2016 | Stancato | G07B 15/00 705/5 |
| 2016/0161950 A1 * | 6/2016 | Frangou | B60W 30/12 701/27 |
| 2016/0189324 A1 * | 6/2016 | Eramian | G06Q 50/30 705/13 |
| 2016/0302044 A1 * | 10/2016 | Bottazzi | H04W 4/04 |
| 2017/0004710 A1 * | 1/2017 | Dozono | G08G 1/144 |

* cited by examiner

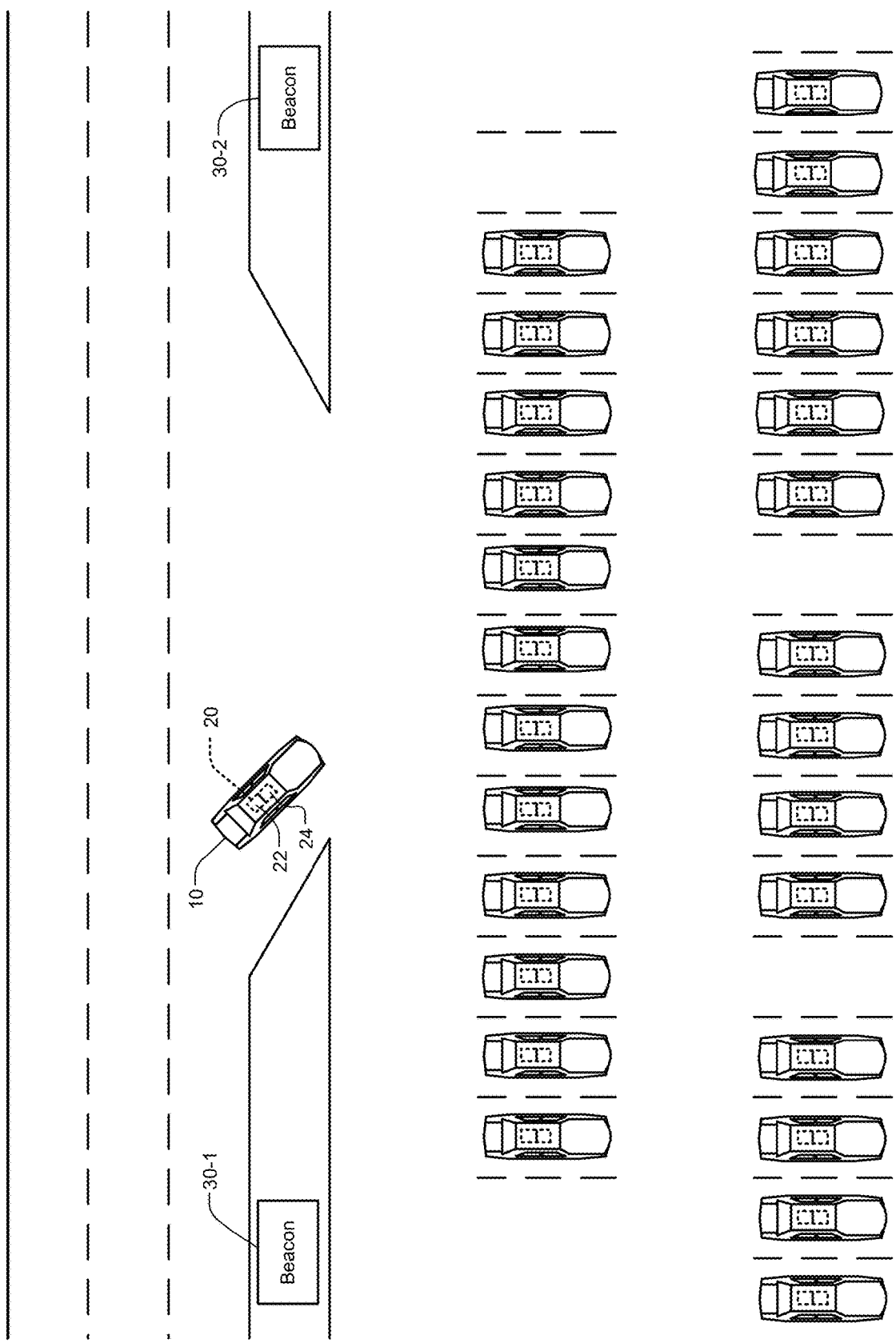

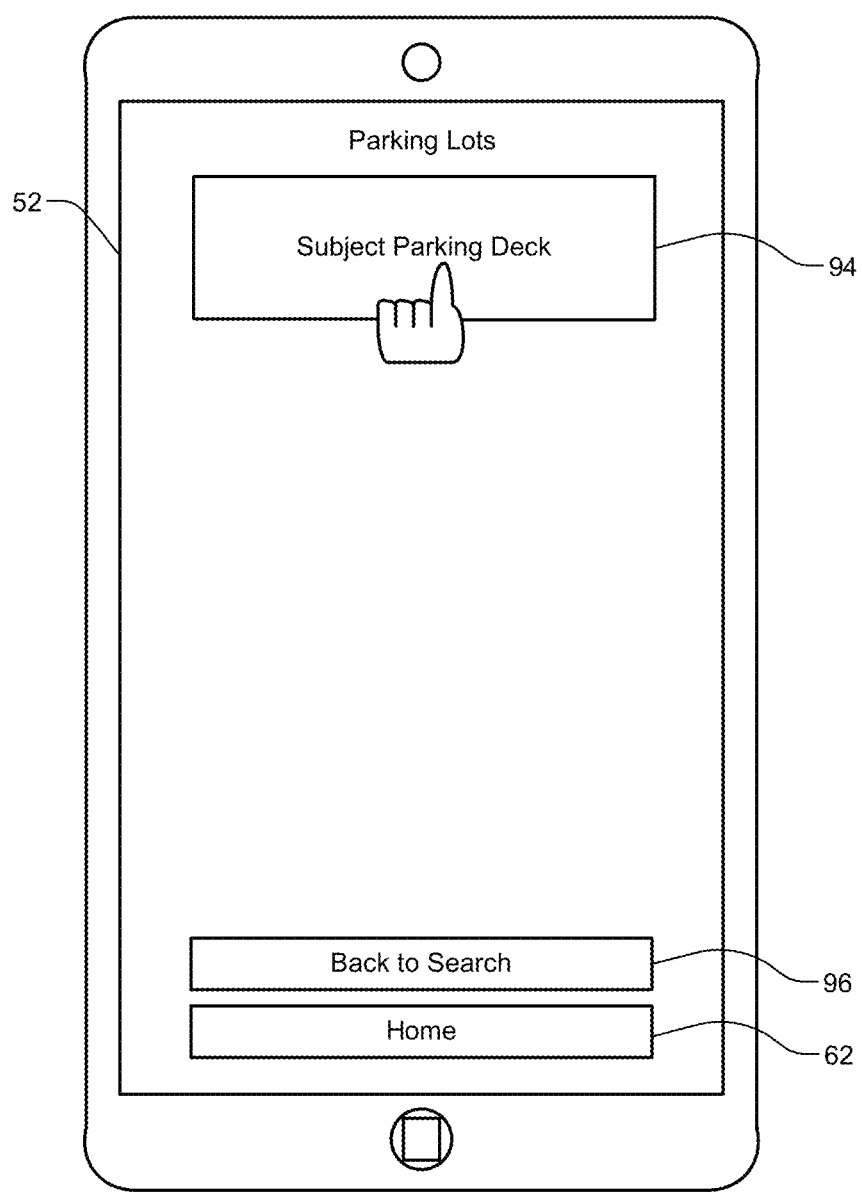

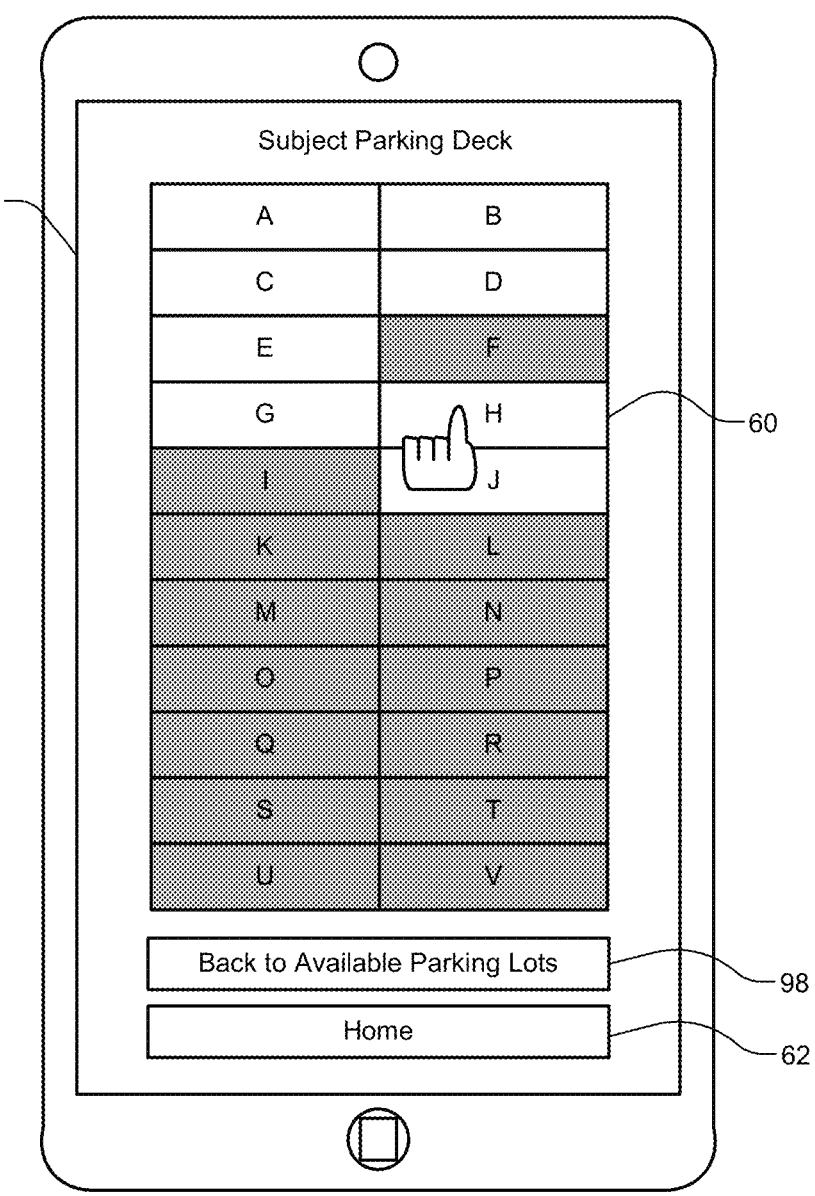

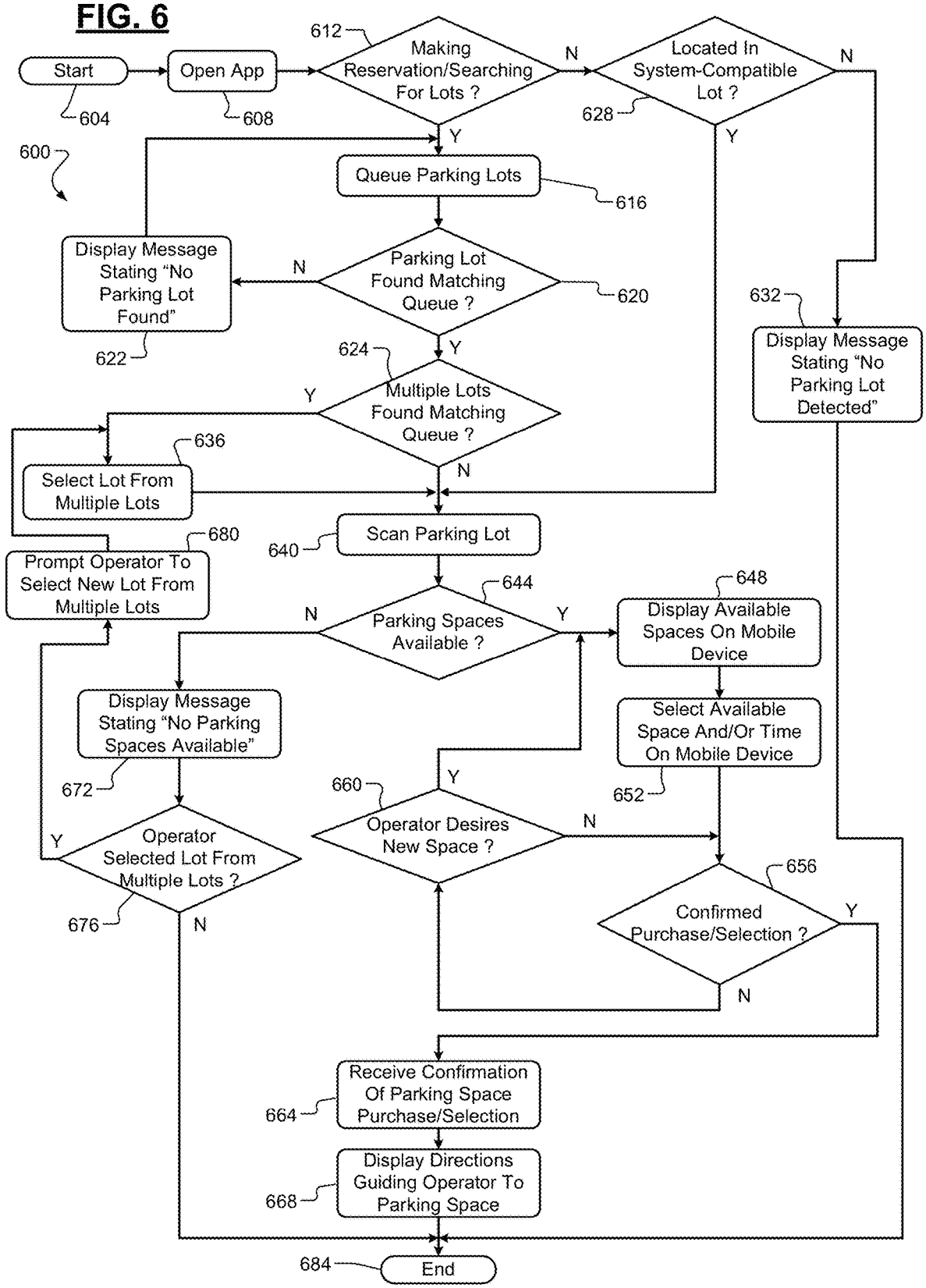

SYSTEM AND METHOD FOR SELECTING A PARKING SPACE USING A MOBILE DEVICE

FIELD

The present disclosure relates to a system and method for selecting a parking space for a vehicle using a mobile device and, more particularly, to a system and method for selecting a parking space for a vehicle using a mobile device and global positioning system and ultra-wide band data.

BACKGROUND

This section provides background information related to the present disclosure which is not necessarily prior art.

Searching for parking in a large parking structure may be frustrating and time-consuming for many drivers, especially in parking structures that comprise multiple parking spaces, sections, floors, etc. Furthermore, excessive navigation of a parking structure causes increased traffic congestion, vehicle wear, and increased fuel emissions. As such, there is a need for an apparatus and a method for selecting and managing a parking lot in order to efficiently facilitate the assignment of vehicles to various parking spaces within a parking lot.

SUMMARY

This section provides a general summary of the disclosure, and is not a comprehensive disclosure of its full scope or all of its features.

The present teachings include systems and methods for selecting a parking space for a vehicle using a mobile device and global positioning system and ultra-wide band data. A communication system is coupled to a vehicle and configured to determine geospatial location data of the vehicle and to transmit the geospatial location data of the vehicle to a server. At least one beacon is in communication with the communication system and configured to provide a reference location from which a part of the geospatial location data is determined. A mobile device is in communication with the server. The server is configured to (i) receive geospatial location data of a plurality of parked vehicles; (ii) compare the geospatial location data of the plurality of parked vehicles with geospatial reference location data of a plurality of parking spaces in a parking lot to determine whether at least one parking space in the parking lot is available; and (iii) communicate to the mobile device whether at least one parking space in the parking lot is available, and wherein the mobile device is configured to generate an output indicating whether at least one parking space is available.

The present teachings also include a method for selecting a parking space in a parking lot. The method includes receiving, with a server, geospatial location data of a plurality of parked vehicles in a parking lot. The method also includes comparing, with the server, the geospatial location data of the plurality of parked vehicles with geospatial reference location data of a plurality of parking spaces in the parking lot to determine whether at least one parking space in the parking lot is available. The method also includes determining, with a communication system of a subject vehicle and at least one beacon, geospatial location data of the subject vehicle. The method also includes communicating, with the communication system, the geospatial location data of the subject vehicle to the server. The method also includes communicating, with the server, data indicating whether at least one parking space in the parking lot is available. The method also includes generating, with the mobile device, output based on whether at least one parking space is available.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B are high-level illustrations of the physical implementation of the apparatus for selecting a parking space in a parking lot;

FIGS. 5A-5G are example embodiments of various application states of the mobile application used to reserve a parking spot; and FIG. 6 is a flowchart showing an example implementation of a method for selecting a parking space in a parking lot.

Corresponding reference numerals indicate corresponding parts throughout the several views of the drawings.

DETAILED DESCRIPTION

Example embodiments will now be described more fully with reference to the accompanying drawings.

Figure 1B:
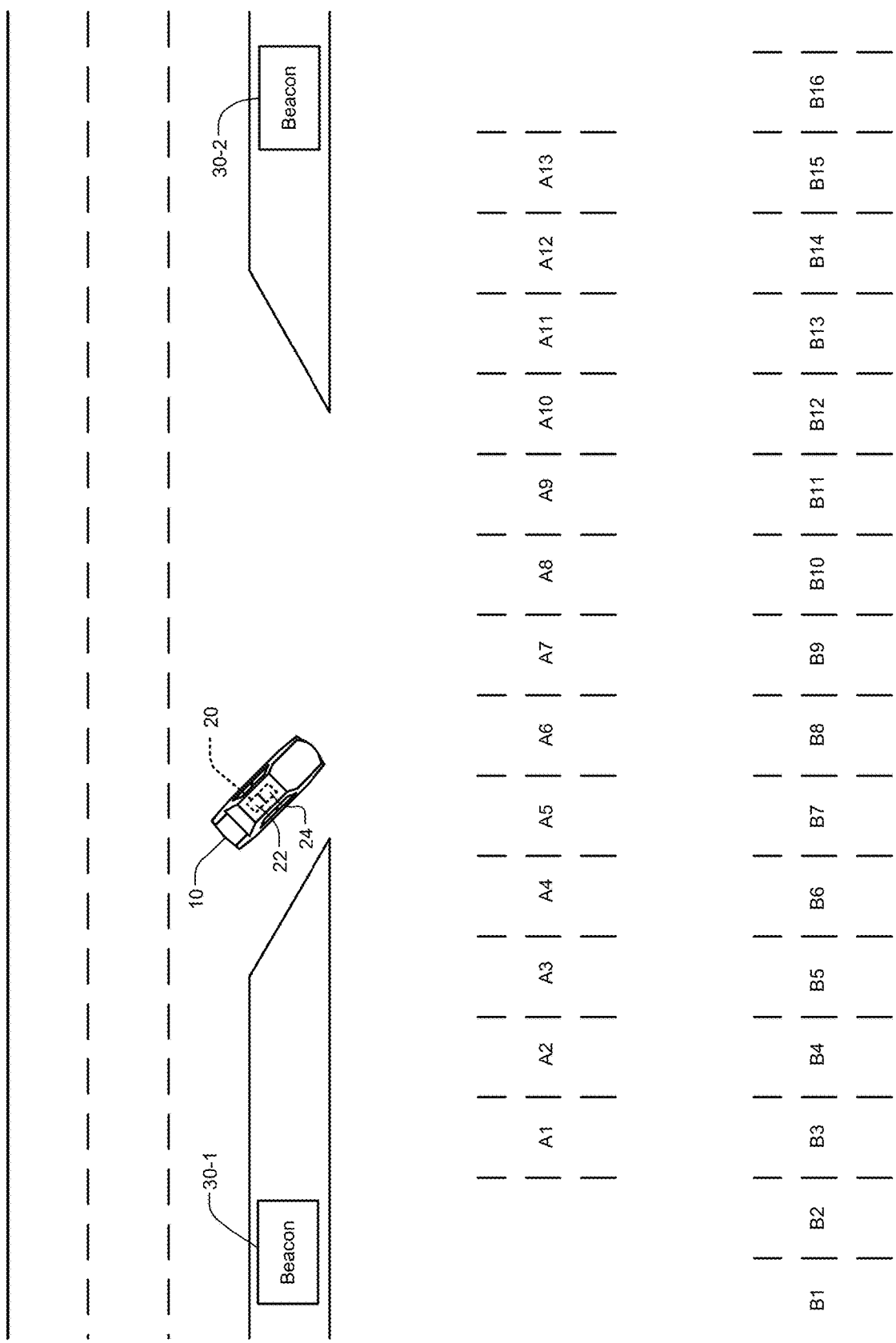

With reference to FIGS. 1A-1B, high-level illustrations of an example physical implementation of the system for selecting a parking space in a parking lot are shown. As an operator of a vehicle 10 enters a parking lot, the operator may wish to search for a parking spot in order to park the vehicle 10. In the example of FIG. 1A, the operator has a relatively small amount of available parking spaces to select from in the parking lot.

In order to determine the status of the parking spaces, the parking lot may be configured to assign each parking space a label and corresponding geospatial reference location data, as shown in FIG. 1B. For example, as shown in this embodiment, each parking space is labeled in alphabetical order corresponding to a distance of the row of parking spaces from the road (e.g., the row closest to the road is labeled A, and the next closest row is labeled B). Additionally, each parking space is labeled in numerical order corresponding to the column of the parking space within the respective row (e.g., the first space on the left is labeled 1, and the space furthest from the left is labeled 13 and 16 in rows A and B, respectively). As such, each labeled parking space may be assigned geospatial reference location data that comprises global positioning system (GPS) and ultra-wide band (UWB) data, as discussed in further detail below. The geospatial reference location data corresponding to each parking space may be stored on a server 40 (shown in FIG. 2).

The vehicle 10 may include a communication system 20 that is configured to communicate geospatial data of the vehicle 10 that can be used to assist the operator while parking the vehicle 10. The communication system 20 may communicate the geospatial location data of the vehicle 10 to the server. The communication system 20 may communicate the geospatial data of the vehicle 10 by acquiring and transmitting data representing the GPS coordinates and UWB data of the vehicle 10 to the server. As such, if the geospatial location data of a parked vehicle is equal (or approximately equal based on an error threshold) to the geospatial reference location data of one the parking spaces, then a mobile device (not shown) may be configured to communicate to the operator that the corresponding parking space is occupied. Accordingly, the parked vehicles in FIG. 1A have geospatial location data that are equal to the corresponding parking space geospatial reference location data. Thus, the operator of the vehicle 10 may be instructed to, using a mobile device, to park the vehicle 10 in a parking space in which the corresponding geospatial reference data is not matched with geospatial location data of the parked vehicles (i.e., the parking space is unoccupied).

In order to acquire GPS data, a satellite (not shown) may send positioning and time information to a dedicated short range communication (DSRC) system 22 of the communication system 20, which is then recorded as GPS data and communicated to the server 40 by the communication system 20. In order to acquire UWB data, a UWB transceiver system 24 of the communication system 20 may transmit and receive UWB signals to/from a plurality of beacons 30-1, 30-2 that have a known position at or near the parking structure or area. As such, using methods such as triangulation, trilateration, or triangulateration, the communication system 20 may be able to determine the position of the vehicle 10 relative to the beacons 30-1, 30-2, and therefore may also be configured to record the position of the vehicle as UWB data. The UWB data may subsequently be communicated to the server. In this way, the communication system 20 can use GPS data and UWB data to determine an accurate location of the vehicle 10 within the parking structure or area.

Figure 2:
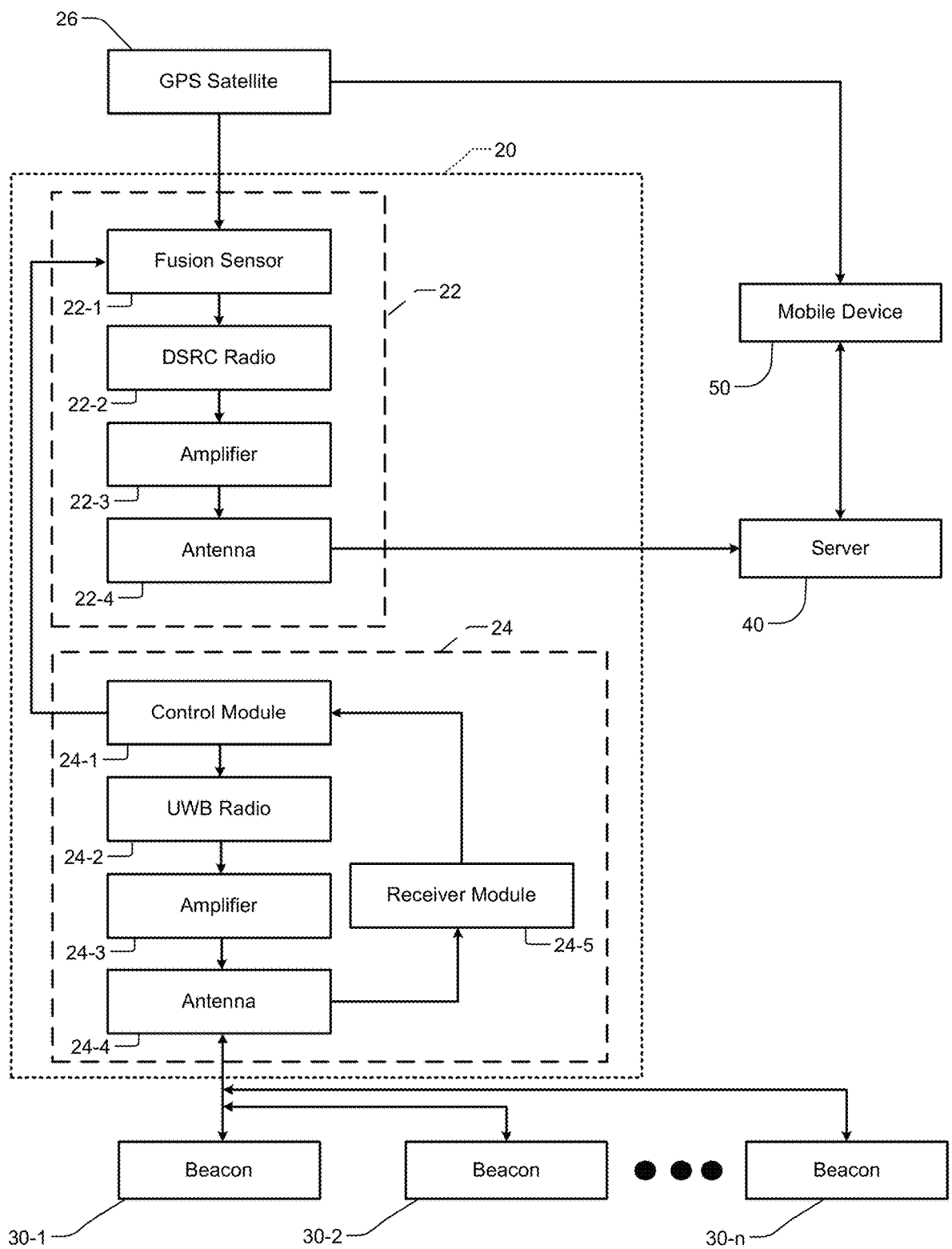
FIG. 2 is a high-level block diagram of the apparatus for selecting a parking space in a parking lot.

FIG. 2 is a high-level block diagram of the system for selecting a parking space in a parking lot. The system includes the communication system 20, which may further include the DSRC system 22 and the UWB transceiver system 24. The system also includes a GPS satellite 26, the plurality of beacons 30, a server 40, and a mobile device 50.

The DSRC system 22 may communicate geospatial location data of the vehicle 10 by transmitting and receiving radio signals in a 75 MHz band around a 5.9 GHz signal. The DSRC system 22 may include a fusion sensor 22-1, a DSRC radio 22-2, an amplifier 22-3, and an antenna 22-4. The fusion sensor 22-1, which may further include a GPS receiver, may receive geospatial location data that includes positioning and time information from the GPS satellite 26 and geospatial location data from the UWB transceiver 24. The DSRC radio 22-2 transmits radio signals representing the geospatial location data from the fusion sensor 22-1 through the antenna 22-4. Additionally or alternatively, the DSRC system 22 may communicate positioning and time information from the GPS satellite 26 and the UWB transceiver 24 via an LTE or other cellular data signal. The amplifier 22-3, which may be a bidirectional amplifier, may electrically couple the DSRC radio 22-2 and the antenna 22-4 via an RF cable. The amplifier 22-3 may increase the range of the signal generated by the DSRC radio 22-2 and increase the lower boundary of signal strength detectable by the antenna 22-4.

The UWB transceiver system 24 may communicate geospatial location data of the vehicle 10 by transmitting and receiving UWB signals having a frequency within the range of 3.1 GHz to 10.6 GHz, which is the authorized range of unlicensed use of UWB signals. However, due to the potential for interference with mobile applications that operate within the UWB frequency range, the spectral density of the radio signals may be optimized in order to avoid interference with mobile applications operating on the same frequency. As such, UWB transceiver system may be configured to transmit radio signals at −41.3 dBm/MHz, which is the limit set forth by the Federal Communications Commission (FCC) for UWB transmitters. Accordingly, the UWB transceiver system may be configured to transmit and receive UWB signals within a 200 meter radius.

The UWB transceiver system 24 may comprise a control module 24-1, a UWB radio 24-2, an amplifier 24-3, an antenna 24-4, and a receiver module 24-5. The control module 24-1 may be configured to provide UWB data to the DSRC system 22, to activate the UWB radio 24-2, and to determine the UWB data based on the UWB signals received at the receiver module 24-5. In this example embodiment, the control module 24-1 may activate the UWB radio by selectively supplying power to the UWB radio 24-2, which, in response to the input power, transmits UWB radio signals to the plurality of beacons 30 through the antenna 24-4. The amplifier 24-3 may electrically couple the UWB radio 24-2 and the antenna 24-4 via an RF cable. The amplifier 24-3 may increase the range of the signal generated by the UWB radio 24-2.

In addition to transmitting UWB signals, the UWB transceiver system 24 may also be configured to receive UWB signals transmitted from the plurality of beacons 30. As such, the receiver module 24-5 may be configured to receive UWB signals through the antenna 24-4. The receiver module 24-5 may comprise an RF filter and an RF amplifier to suppress image frequencies and to prevent saturation of the system. A local oscillator of the receiver module 24-5 may be configured to provide a mixing frequency to a frequency mixer in order to change the received frequency into a new, intermediate frequency. An intermediate frequency filter and amplifier may be configured to amplify the signal and limit the intermediate frequencies to a certain bandwidth. Subsequently, a demodulator may extract the desired modulation from the filtered intermediate frequency and deliver the extracted modulation to the control module 24-1. In response to the extracted modulation, the control module 24-1 may be able to determine the position of the vehicle 10, as described below.

As an example, the control module 24-1, using triangulation, trilateration, or triangulateration, may be able to determine the position of the vehicle 10 based on the UWB transceiver's position and an identity of the UWB transceiver. Based on this information, heading and distance from at least one of a fixed position to the UWB transceiver's position can be determined. At each of the fixed positions, the plurality of beacons 30-1, 30-2 . . . 30-n may be configured to provide reference locations from which the UWB transceiver system 24 of the vehicle 10 uses to determine its position. Alternatively, the beacons 30 may be replaced by an additional UWB transceiver that is configured to provide a reference location from which the vehicle 10 uses to determine its position.

The control module 24-1 may include a nontransitory computer readable medium, such as read-only memory and/or random-access memory component, with instructions executable by a processor. The instructions may include algorithms that allow the control module 24-1 to determine and transmit geospatial location data of the vehicle based on triangulation, trilateration, or triangulateration of the UWB transceiver's position and the identity of the UWB transceiver 24. Furthermore, the control module 24-1 may have instructions that allow the control module 24-1 to selectively activate the UWB radio 24-2.

The server 40 may be configured to store geospatial location data transmitted from the communication system 20 of the vehicle 10 in addition to storing the geospatial reference location data of the parking spaces. The DSRC system 22 may be configured to transmit GPS data and UWB data acquired from the DSRC system 22 and the UWB transceiver 24, respectively, on a 75 MHz band around a 5.9 GHz signal. Alternatively, the DSRC system 22 may communicate the geospatial location data of the vehicle 10 to the server 40 by using an LTE or other cellular data signal, Wi-Fi, Bluetooth, or other telemetric link.

The server 40 may also be configured to store geospatial location data transmitted from the communication system 20 of the vehicle 10 when the vehicle is in the parking lot. As such, when the vehicle 10 leaves a parking space and exits the parking lot, the geospatial location data of the vehicle 10 may be erased from the memory of the server 40, thereby allowing another operator of another vehicle entering the parking lot to detect the parking space as being available.

Accordingly, the mobile device 50 may be configured to retrieve the geospatial location data from the vehicle 10 and the geospatial reference data of the parking spaces in order to determine whether there are available parking spaces and to guide the vehicle 10 to the available parking space. The mobile device 50 may be a smartphone, laptop, PDA, or other device of the like. To perform this step, the mobile device 50 may include a nontransitory computer readable medium, such as read-only memory and/or random-access memory component, with instructions executable by a processor. The instructions may include algorithms that allow the mobile device 50 to determine and communicate whether a parking space is occupied based on a matching of a geospatial reference location of the parking spaces and geospatial locations of the other vehicles. The instructions may also include algorithms that allow the mobile device 50 to guide the operator of the vehicle to an unoccupied parking space provided that the corresponding geospatial reference location data of the parking space does not match geospatial location data of another vehicle.

The mobile device 50 may also be configured to communicate with the server 40 and the GPS satellite 26 in order to determine whether the operator of the mobile device 50 in the vehicle 10 is located in a parking lot that is equipped with the parking lot system. As an example, the mobile device 50 may receive position and time data from a GPS satellite via a GPS receiver located within the mobile device 50. Once received by the GPS receiver, the position and time data of the mobile device in the vehicle may be communicated to the server 40 via an LTE or other cellular signal, Wi-Fi, or Bluetooth Link. The server 40 may then generate a response to the mobile device 50 indicating whether the mobile device 50 in the vehicle 10 is located in a parking lot that is equipped with the parking lot system.

The mobile device 50 may also be configured to perform a priority algorithm in determining whether to first evaluate the GPS data or the UWB data of the vehicle 10. GPS data obtained from a satellite is accurate within ±1 meter, while UWB data is accurate within ±12 centimeters. Accordingly, the mobile device 50 may be configured to first compare the UWB data of the vehicle 10 to the reference UWB location data of the parking spaces before comparing the GPS data. Additionally or alternatively, the mobile device 50 may be configured to first compare the GPS data of the vehicle 10 to the reference GPS location data of the parking spaces if the vehicle 10 is outside of the range of UWB signal transmission, which may be 200 meters.

Figure 3A:
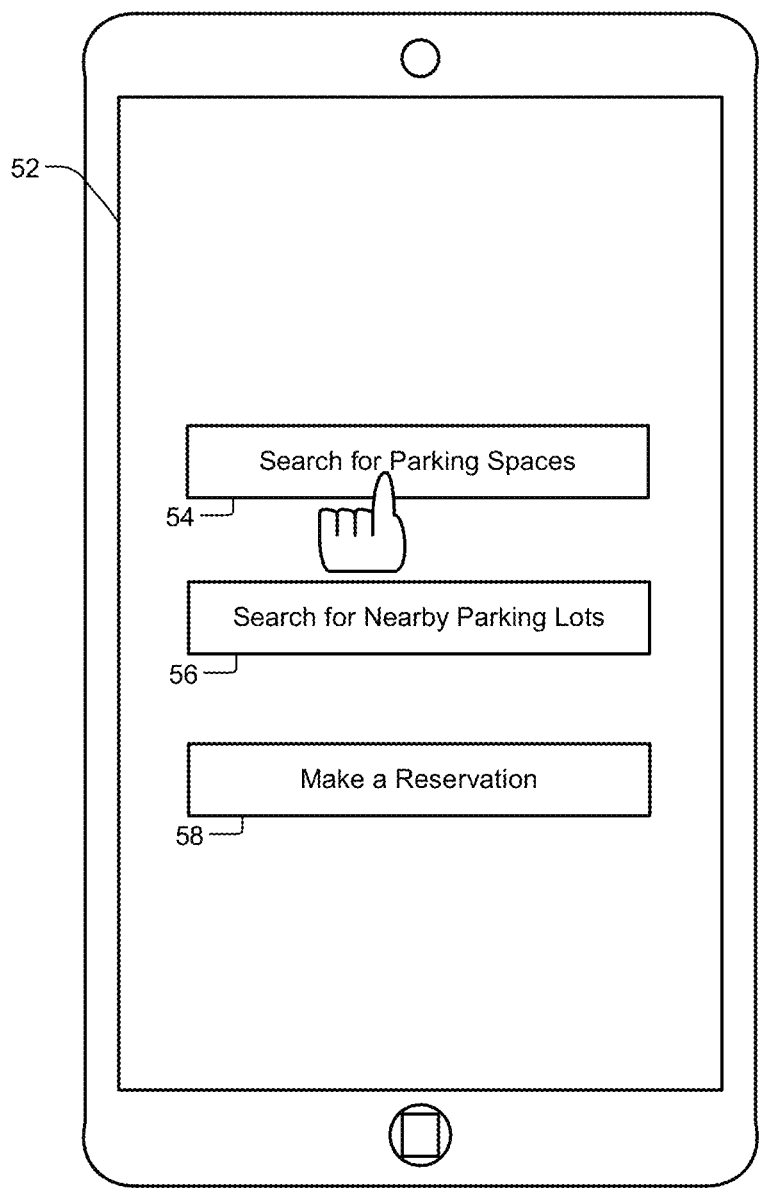
FIGS. 3A-3D are example embodiments of various application states of a mobile application used to select a parking space.

With reference to FIGS. 3A-3D, example embodiments of various application states of a mobile application (App) used to select a parking space in a parking lot are shown. With reference to FIG. 3A, an example embodiment of a default app state of an App that is used to select a parking space in a parking lot is shown. In this embodiment, the mobile device 50 is a smartphone. Alternatively, a laptop, PDA, or other device of the like may be used.

The default app state of the App is shown on a display 52 of the mobile device 50. The App may be set to the default app state when the App is initialized by opening the App on the mobile device 50. The default app state is configured to provide an operator of the mobile device 50 the capability to search for parking spaces in a parking lot; search for nearby parking lots; and reserve a parking space in a parking lot. As an example, the default app state may provide a "Search for Parking Spaces" button 54, a "Search for Nearby Parking Lots" button 56, and a "Make a Reservation" button 58 on the display 52 of the mobile device 50. Accordingly, once the operator selects the "Search for Parking Spaces" button 54, as shown by a cartoon hand, the App is configured to set itself to the next app state corresponding to searching for parking spaces in a parking lot.

Figure 3B:
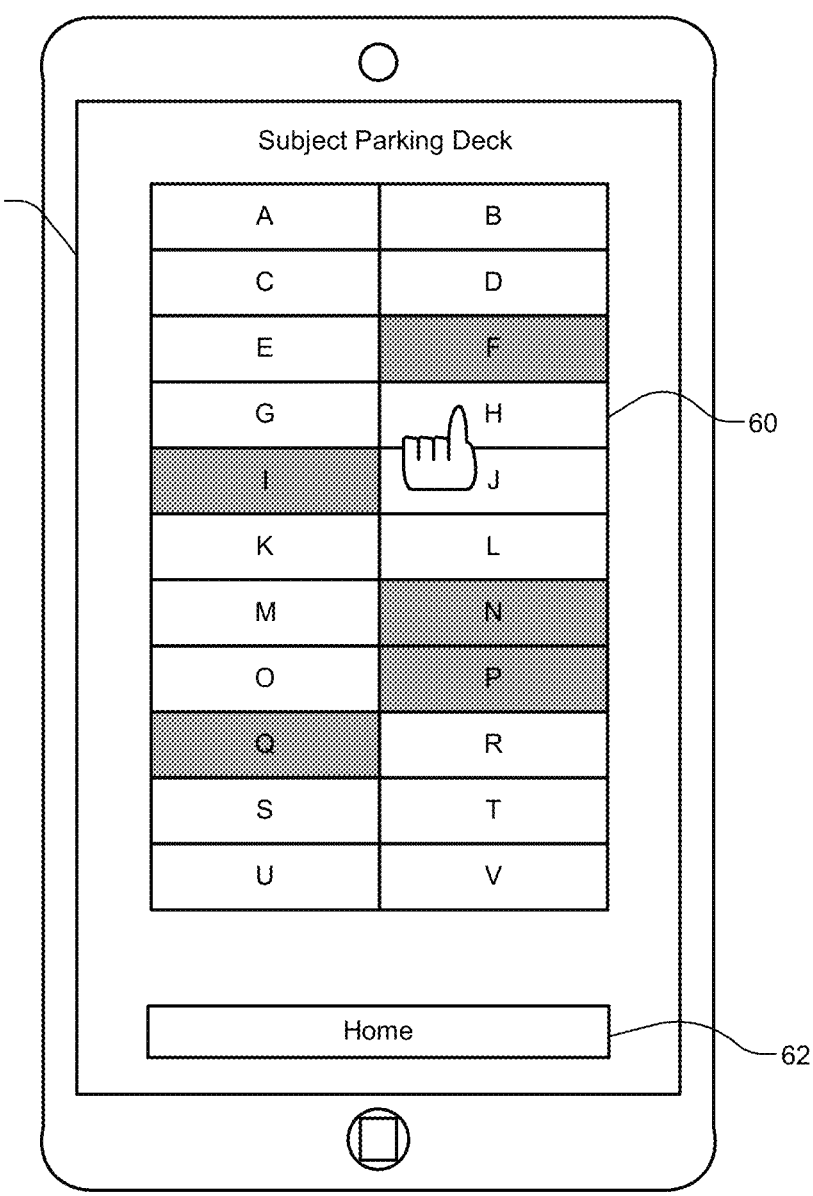

With reference to FIG. 3B, an example embodiment of a section selection app state is shown on the display 52 of the mobile device 50. The App may be set to the section selection app state when the operator selects the "Search for Parking Spaces" button 54 as described in FIG. 3A. The section selection app state is configured to provide an operator the capability to select a section of parking spaces for parking a vehicle 10, provided that the parking lot is equipped with the parking system described above in FIGS. 1A-1B and FIG. 2. If the operator selects the "Search for Parking Spaces" button 54 in the default app state and the vehicle 10 is not located in a parking lot equipped with the parking system described above, an error message may be displayed on the display 52 that communicates to the operator that he or she is not in a parking lot equipped with the system. Otherwise, if the vehicle 10 is in a parking lot equipped with the parking system, then the parking lot name and various sections of the parking lot may be displayed on the mobile device 50.

As an example, the operator of the mobile device 50 and the vehicle 10 may be in a Subject Parking Deck. For illustration purposes, it will be assumed that the parking lot is equipped with the parking system described above. When the operator selects the "Search for Parking Spaces" button 54 in the default app state and the geospatial reference location and vehicle location matching algorithm described in FIG. 2 has been performed by the mobile device 50, the section selection app state may display the various parking sections of the parking lot. Although FIG. 3B is merely shown for illustration purposes and may not necessarily reflect the various parking sections located within the Subject Parking Deck, as shown in the figure, the Subject Parking Deck may be divided into sections A-V.

Furthermore, the section selection app state may be configured to display which parking sections are unavailable and/or at maximum capacity. As an example, the section selection app state may gray out and disable the buttons corresponding to the parking sections that are unavailable and/or at maximum capacity. As shown in FIG. 3B, sections F, I, N, P, and Q are grayed out and are disabled as a result of the sections being unavailable and/or at maximum capacity.

Additionally or alternatively, the section selection app state may be configured to alter the display of the various buttons corresponding to the parking sections based on a variety of factors. As an example, the section selection app state may be configured to set a button to a different color and/or shape if there are only handicap parking spaces in the section, if there are only parking spaces that require a payment, or if there are free parking spaces available within the section, etc.

As shown in this example embodiment, based on the unavailability of sections F, I, N, P, and Q, the operator of the mobile device and the vehicle has selected a button 60 corresponding to section H of the Subject Parking Deck. Alternatively, if the operator desires to return to the default app state, the operator may select a "Home" button 62 that is configured to set the App to the default app state.

Figure 3C:
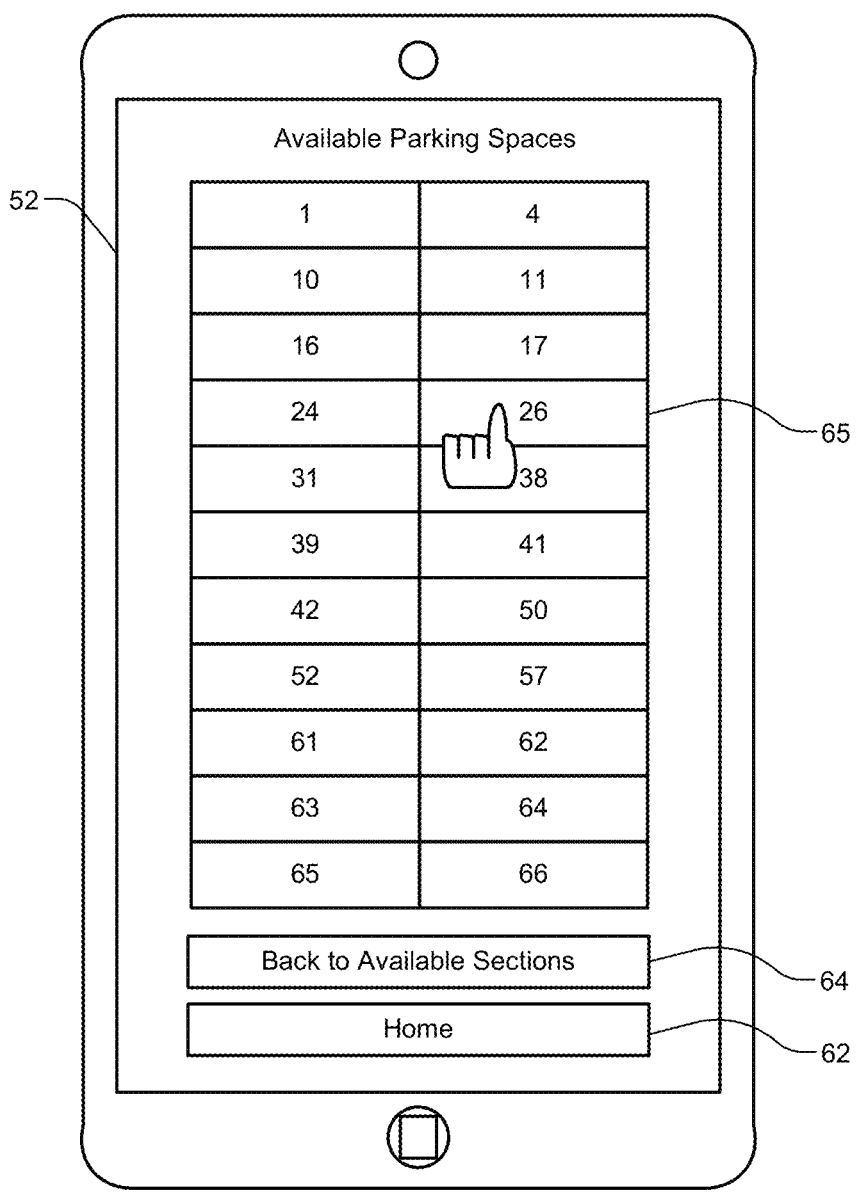

With reference to FIG. 3C, an example embodiment of a parking space selection app state is shown on the display 52 of the mobile device 50. The App may be set to the parking space selection app state when the operator selects a button corresponding to a section with available parking spaces in the section selection app state as described in FIG. 3B. The parking space selection app state is configured to provide an operator the capability to select a parking space within a section for parking the vehicle 10. Alternatively, if the parking lot is not divided into sections, the App may be configured to bypass the parking section selection app state and proceed to the parking space selection app state once the operator selects the "Search for Parking Spaces" button 54 in the default app state.

As an example, if the operator of the mobile device 50 and the vehicle is in the Subject Parking Deck and has selected the button corresponding to section H (as described in FIGS. 3A-3B), the parking space selection app state may provide a list of available parking spaces in section H. While only the available spaces in this section are shown in this embodiment, alternatively, all parking spaces within the chosen section may be shown, and those parking spaces that are unavailable may be grayed out as described above. Additionally or alternatively, the display of the various buttons may have different colors and/or shapes to represent, for example, handicap spaces and pricing options.

As shown in this example embodiment, the operator of the mobile device 50 has selected button 65 corresponding to parking space #26. Alternatively, if operator desires to return to the section selection app state in order to select a new section, the operator may select the "Back to Available Sections" button 64. If the operator desires to return to the default app state, the operator may select the "Home" button 62 that is configured to set the App to the default app state.

Figure 3D:
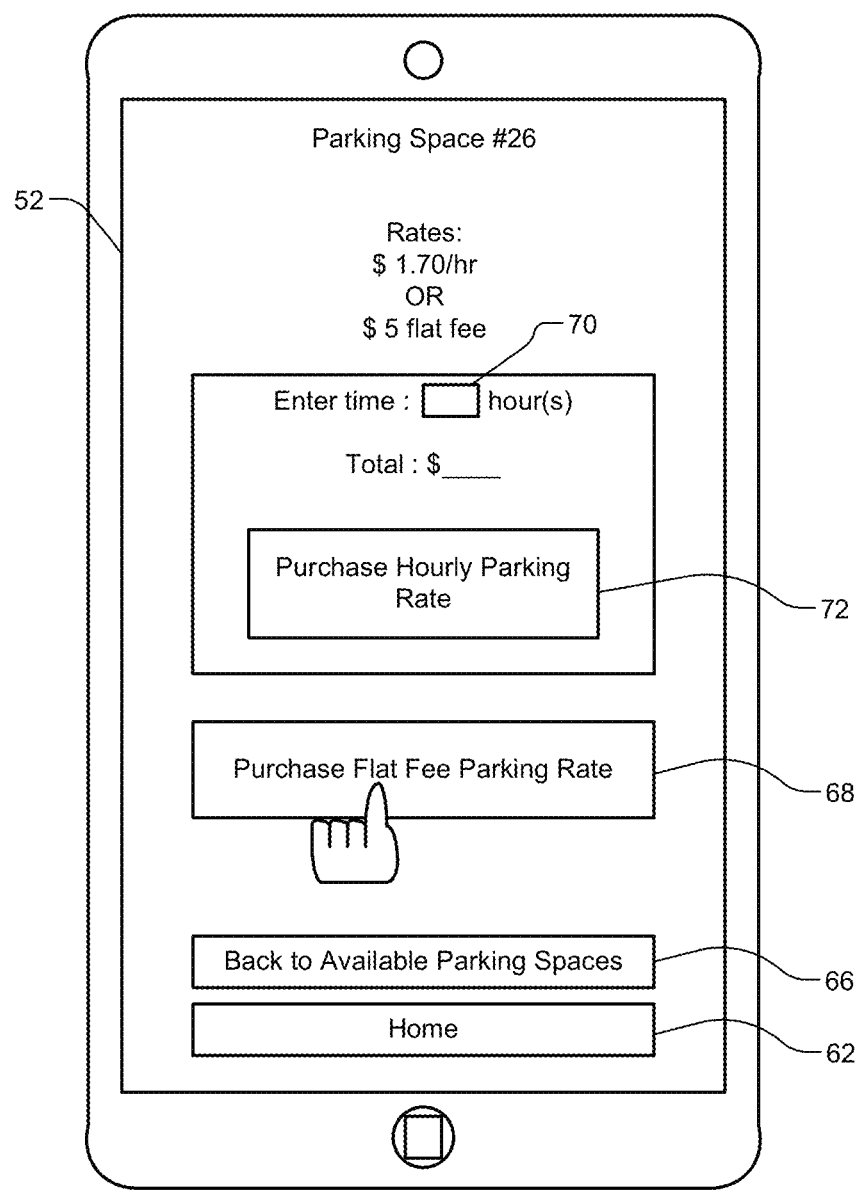

With reference to FIG. 3D, an example embodiment of a purchase app state is shown on the display of the mobile device 50. The App may be set to the purchase app state when the operator selects a button corresponding to a parking space in the parking space selection app state as described in FIG. 3C. The purchase app state is configured to provide the operator the capability to purchase and/or select a parking space. Once the operator has made a purchase and/or selection, the purchasing app state may be configured to provide a message on the display 52 that communicates to the operator that the purchase has been confirmed by the App and then proceed to the next app state.

As shown in this example embodiment, if the operator of the mobile device and the vehicle is in the Subject Parking Deck, has selected section H, and has selected parking space #26, then the operator may be prompted with an option to purchase parking at an hourly rate or at a flat fee. The operator may choose the hourly rate option if the operator determines that the flat fee option would be more expensive based on the amount of time the operator intends to use the parking space.

If the operator chooses the hourly rate option, the operator may set the amount of time the operator intends to use the parking space by pressing button 70, which is configured to load a keyboard on the mobile device 50, thereby allowing the operator to input the amount of time desired. The purchasing app state may be configured to have a predefined set of intervals from which an operator can input the time. For example, the intervals may be one hour, half-hour, quarter-hour intervals, or any other time interval. Once the operator has specified the time interval, the total cost of the parking space may be automatically updated in the "Total" portion of the display so that the operator may view the cost of the hourly rate option based on the time input. If the operator is satisfied with this option, the operator may select the "Purchase Hourly Parking Rate" button 72 to purchase the spot. Subsequently, a message may appear on the display 52 that communicates to the operator that the purchase has been confirmed by the App.

If the operator desires the flat rate option, the operator may select a "Purchase Flat Fee Parking Rate" button 68. Subsequently, a message may appear on the display 52 that communicates to the operator that the purchase has been confirmed by the App.

If the parking space chosen by the operator is free, then the hourly rate options may be grayed out and disabled. As such, the mobile device 50 may communicate to the operator that the flat fee option for this space is $0 (i.e., free), and the operator may select the "Purchase Flat Fee Parking Rate" button 68. Subsequently, a message may appear on the display 52 that communicates to the operator that the purchase has been confirmed by the App.

After the message on the display 52 communicates that the purchase has been confirmed by the App, the App may proceed to a navigation app state, which is configured to provide instructions for the operator describing how to arrive to the purchased parking spot. The navigation app state may include a listing of text that provides step-by-step instructions describing how to arrive to the parking space. Additionally or alternatively, the navigation app state may provide an interactive map that provides a graphical representation of the step-by-step instructions describing how to arrive to the parking space. Additionally or alternatively, the navigation app state may provide turn-by-turn voice instructions directing the operator of the vehicle 10 to the parking space.

Alternatively, the parking section selection app state and the parking space selection app state may be bypassed, and the App may be configured to perform the operations in each of these steps automatically. The App may be configured to select a section and a parking space based on a variety of parameters, wherein the App is configured to optimize price, distance away from the building, etc. As an example, the App may be configured to select the cheapest parking selection and parking space available after it has scanned the parking lot. Once these selections are automatically made, the App may set itself to the purchase app state.

Figure 4A:
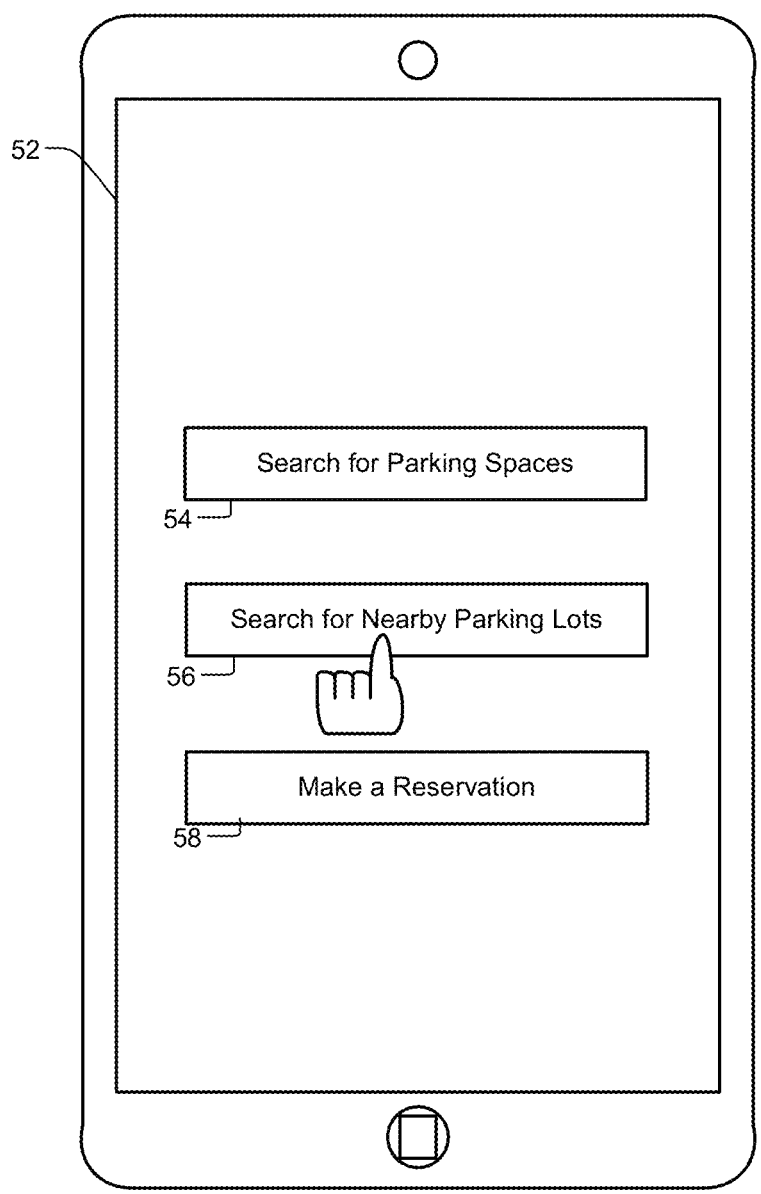
FIGS. 4A-4F are example embodiments of various application states of the mobile application used to search for nearby parking lots.

With reference to FIGS. 4A-4F, example embodiments of various application states of an App used to search for a nearby parking lot are shown. With reference to FIG. 4A, an example embodiment of the default app state of the App that is used to select a parking space in a parking lot is shown. In this embodiment, the mobile device 50 is a smartphone. Alternatively, a laptop, PDA, or other device of the like may be used.

The default app state of the App is shown on the display 52 of the mobile device 50. The App may be set to the default app state when the App is initialized by opening the App on the mobile device 50. The default app state is configured to provide an operator of the mobile device 50 the capability to search for parking spaces in a parking lot, to search for nearby parking lots, and to reserve a parking space in a parking lot. As an example, the default app state may provide the "Search for Parking Spaces" button 54, the "Search for Nearby Parking Lots" button 56, and the "Make a Reservation" button 58 on the display of the mobile device 50. Accordingly, once the operator selects the "Search for Nearby Parking Lots" button 56, as shown by a cartoon hand, the App is configured to set itself to the next app state corresponding to searching for parking lots.

Figure 4B:
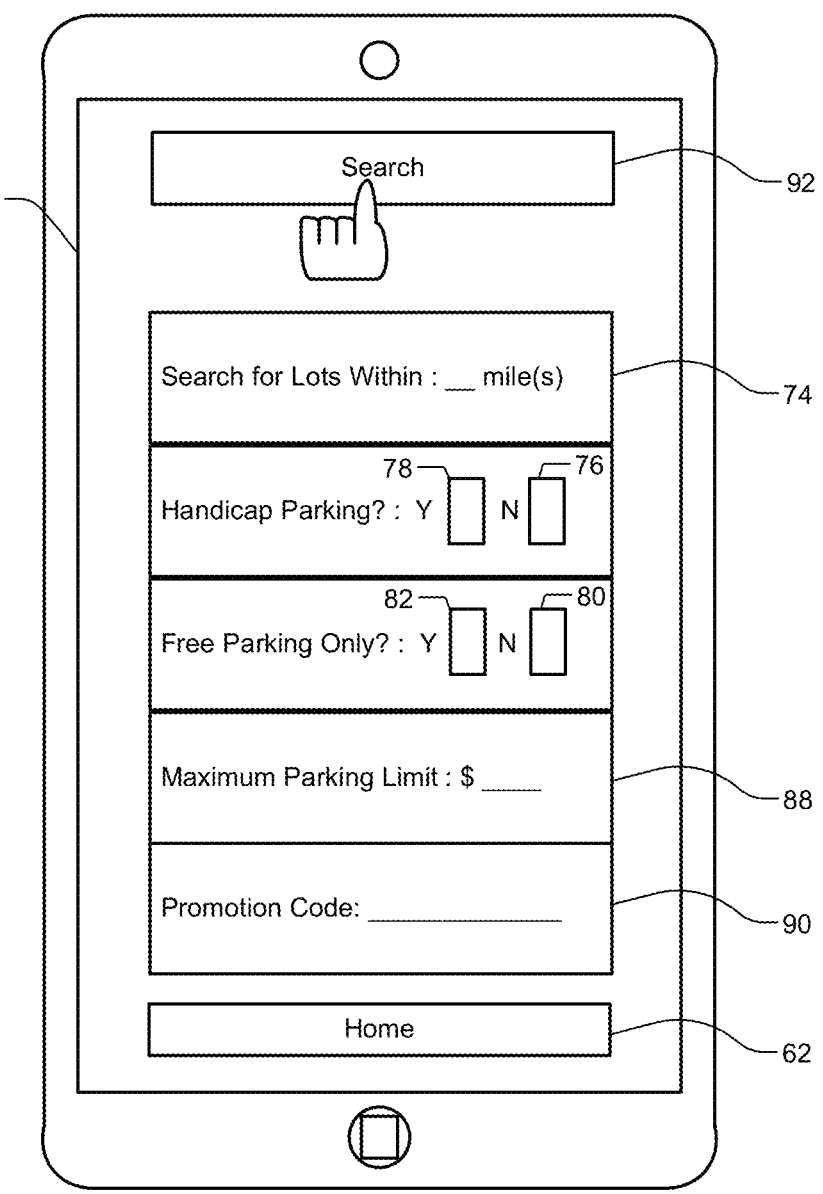

With reference to FIG. 4B, an example embodiment of a queue app state is shown. The App may be set to the queue app state when the operator of the mobile device 50 selects the "Search for Nearby Parking Lots" button 56 at the default app state. The queue app state may be configured to provide the operator of the mobile device 50 the opportunity to search for nearby parking lots equipped with the parking lot system. As an example, the display 52 may provide an interface for which the operator may search for: parking lots within a set radius from the operator's current location, parking lots with available handicap spaces, parking lots with only free parking; parking lots that do not charge over a certain amount, and parking lots that are accepting coupons or promotion codes. If the operator of the mobile device 50 wishes to search for parking lots within a certain radius, establish a maximum parking limit, or enter a promotion code, the operator may select buttons 74, 88, and 90 corresponding to the respective functions. Once selected, a keyboard of the mobile device 50 may be loaded, thereby allowing the operator to input the numbers and/or letters corresponding to the operator's queue. If the operator wishes to filter the queue even further by selecting handicap and/or free parking only, then the operator may click on buttons 76, 78, 80, and 82 corresponding to the operator's queue. As an example, if the operator is searching for free parking only, the operator may select button 82.

Once the operator has input all of the desired search parameters, the operator may select a "Search" button 92 to proceed to the next app state. Alternatively, if the operator desires to return to the default app state, the operator may select a "Home" button 62 that is configured to set the App to the default app state.

Figure 4C:
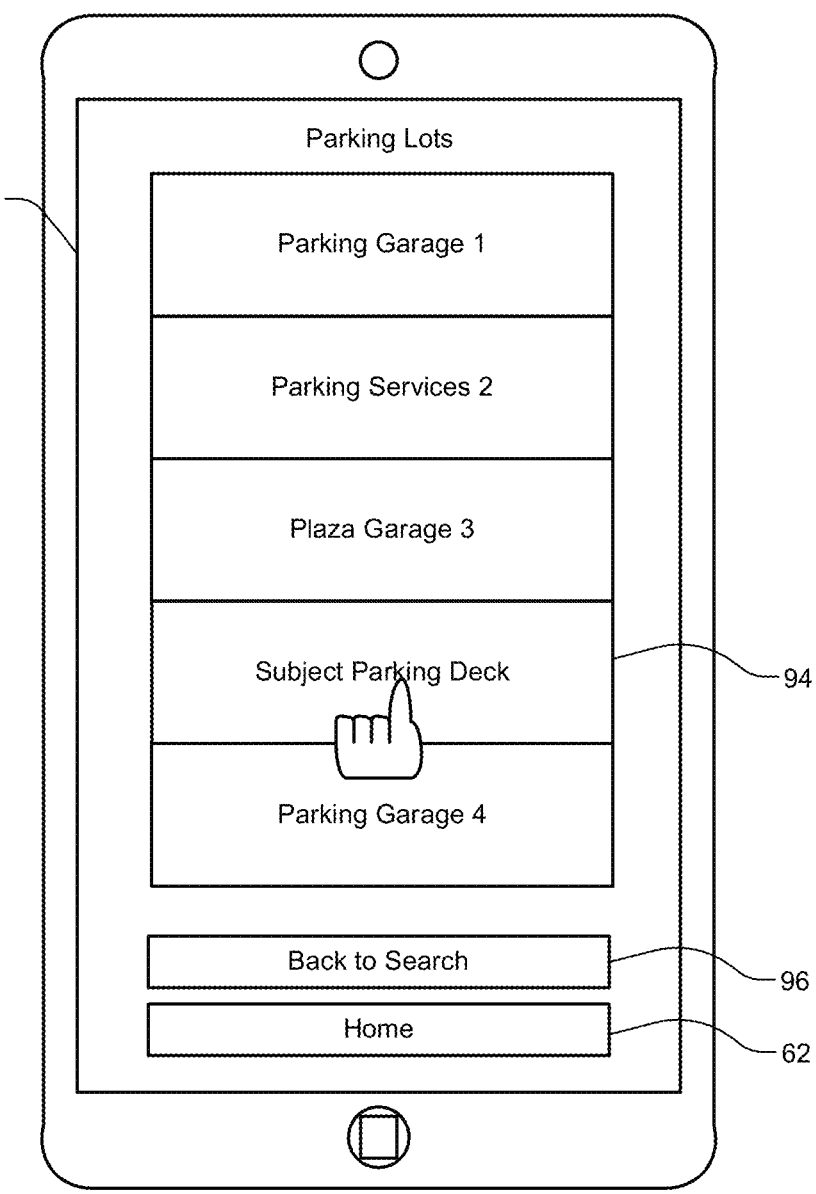

With reference to FIG. 4C, an example embodiment of a queue results app state is shown. Once the operator has selected the search button 92 in the queue app state, the App is configured to proceed to the queue results app state. The queue results app state is configured to search a table stored within the server and display the parking lots with characteristics that match the queue parameters from the queue app state. The available parking lots may be displayed such that the parking lots that match more of the queue parameters are displayed at the top of the screen, and the remaining parking lots are displayed based on the number of queue parameter matches. As an example, if the operator queues parking lots within 1 mile of the operator's location, does not want handicap parking, does not want free parking only, is willing to pay $10 for parking, and does not have a promotion code, the queue results app state will display those parking lots that match all the above criteria first, and then it may next display the parking lots that match four of the five queue parameters, etc.

If the operator enters queue parameters in the queue app state that do not match any of the parking lot characteristics, then the queue results app state may be configured to display a message that states "No results found, please repeat your search," etc. Furthermore, the App may be configured to return from the queue results app state to the queue app state in order to repeat the search.

As shown in FIG. 4C, the queue results app state generated a list of parking lots that match the queue parameters from the queue app state. As an example, the operator may choose button 94 corresponding to the Subject Parking Deck as the desired parking lot. If the operator wishes to repeat the queue, the operator may select a "Back to Search" button 96 in order to repeat the queue. Alternatively, if the operator desires to return to the default app state, the operator may select a "Home" button 62 that is configured to set the App to the default app state.

Figure 4D:
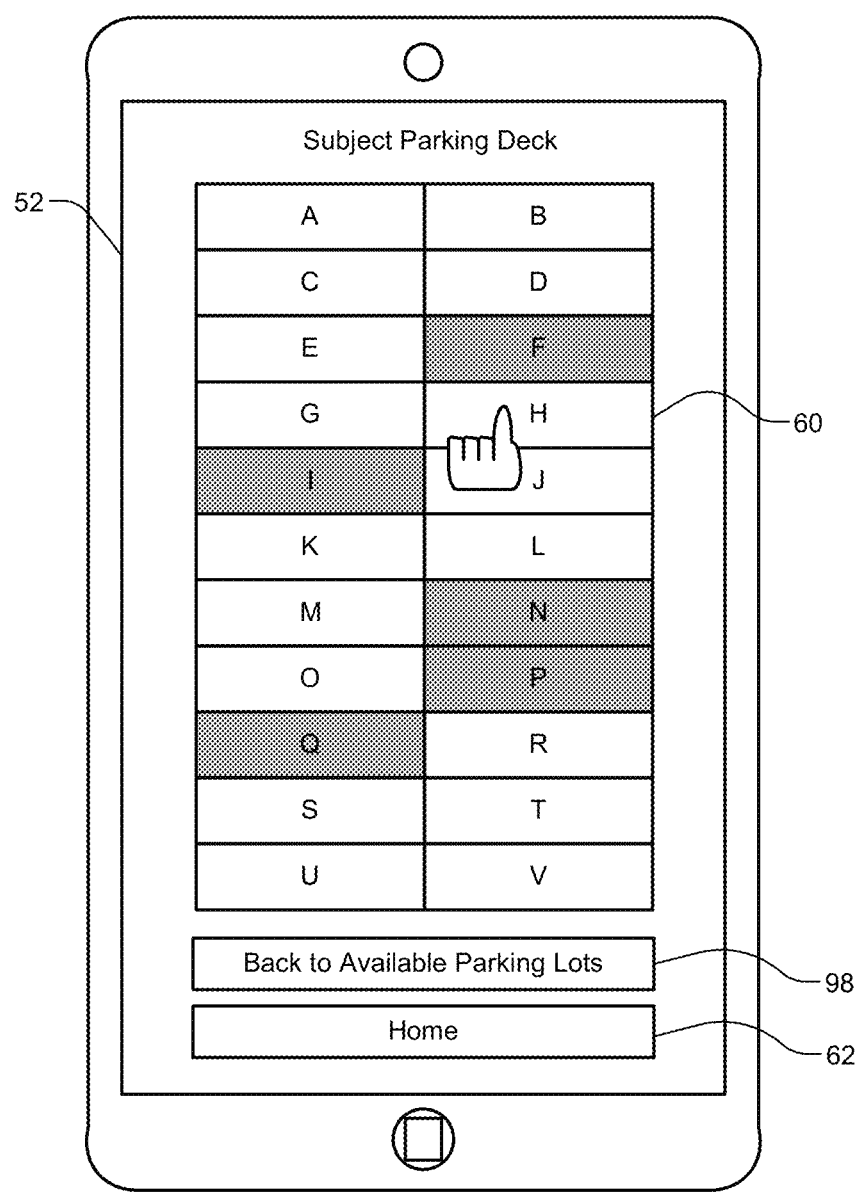

With reference to FIG. 4D, an example embodiment of the section selection app state is shown on the display 52 of the mobile device 50. The App may be set to the section selection app state when the operator selects a parking lot from the list of parking lots in the queue results app state as described in FIG. 4C. Alternatively, the queue results app state may be bypassed and set to the parking section selection app state if only one parking lot matches the queue parameters set forth in the queue app state.

The section selection app state is configured to provide an operator the capability to select a section of parking spaces for parking the vehicle 10. Once the operator selects a parking lot in the queue results app state, the section selection app state may be configured to display the various parking sections of the parking lot. Although FIG. 4D is merely shown for illustration purposes and may not necessarily reflect the various parking sections located within the Subject Parking Deck, as shown in the figure, the Subject Parking Deck may be divided into sections A-V.

Furthermore, the section selection app state may be configured to display which parking sections are unavailable and/or at maximum capacity. As an example, the section selection app state may gray out and disable the buttons corresponding to the parking sections that are unavailable and/or at maximum capacity. As shown in FIG. 4D, sections F, I, N, P, and Q are grayed out and are disabled as a result of the sections being unavailable and/or at maximum capacity.

Additionally or alternatively, the section selection app state may be configured to alter the display of the various buttons corresponding to the parking sections based on a variety of factors. As an example, the section selection app state may be configured to set a button to a different color and/or shape if there are only handicap parking spaces in the section, there are only parking spaces that require a payment, or there are free parking spaces available within the section, etc.

As shown in this example embodiment, based on the unavailability of sections F, I, N, P, and Q, the operator of the mobile device and the vehicle has selected the button 60 corresponding to section H of the Subject Parking Deck. If the operator wishes to search for parking spaces in a different parking lot, the operator may select a "Back to Available Parking Lots" button 98 that is configured to set the App to the queue results app state. Alternatively, if the operator desires to return to the default app state, the operator may select a "Home" button 62 that is configured to set the App to the default app state.

Figure 4E:
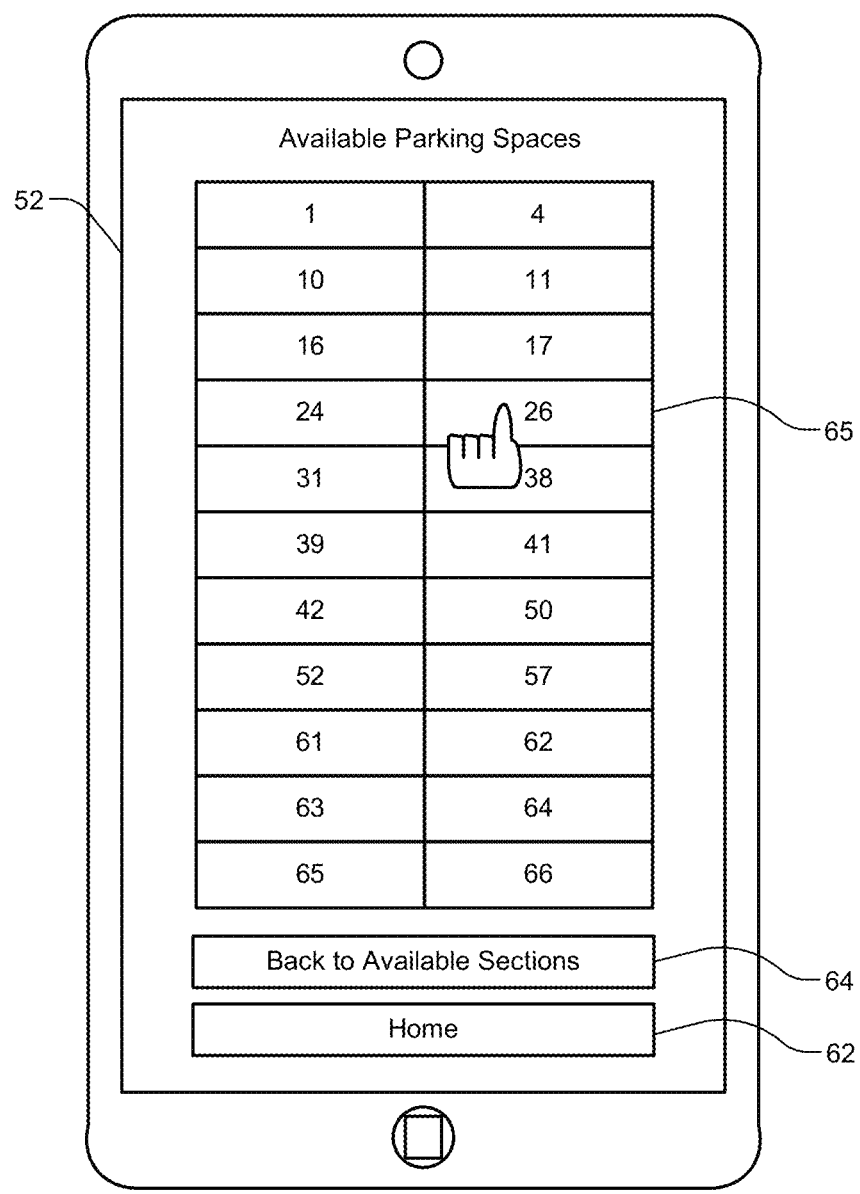

With reference to FIG. 4E, an example embodiment of the parking space selection app state is shown on the display 52 of the mobile device 50. The App may be set to the parking space selection app state when the operator selects a button corresponding to a section with available parking spaces in the section selection app state as described in FIG. 4D. The parking space selection app state is configured to provide an operator the capability to select a parking space within a section for parking a vehicle. Alternatively, the App may be configured to bypass the section selection app state once the operator selects the parking lot from the queue results app state if the parking lot is not divided into sections.

As an example, if the operator of the mobile device 50 and the vehicle is in the Subject Parking Deck and has selected section H, the parking space selection app state may provide a list of available parking spaces in section H. While only the available spaces in this section are shown in this embodiment, alternatively, all parking spaces within the chosen section may be shown, and those parking spaces that are unavailable may be grayed out as described above. Additionally or alternatively, the display of the various buttons may have different colors and/or shape to represent, for example, handicap spaces and pricing options.

As shown in this example embodiment, the operator of the mobile device and the vehicle has selected button 65 corresponding to parking space #26. Alternatively, if operator desires to return to the section selection app state in order to select a new section, the operator may select the "Back to Available Sections" button 64. If the operator desires to return to the default app state, the operator may select the "Home" button 62 that is configured to set the App to the default app state.

Figure 4F:
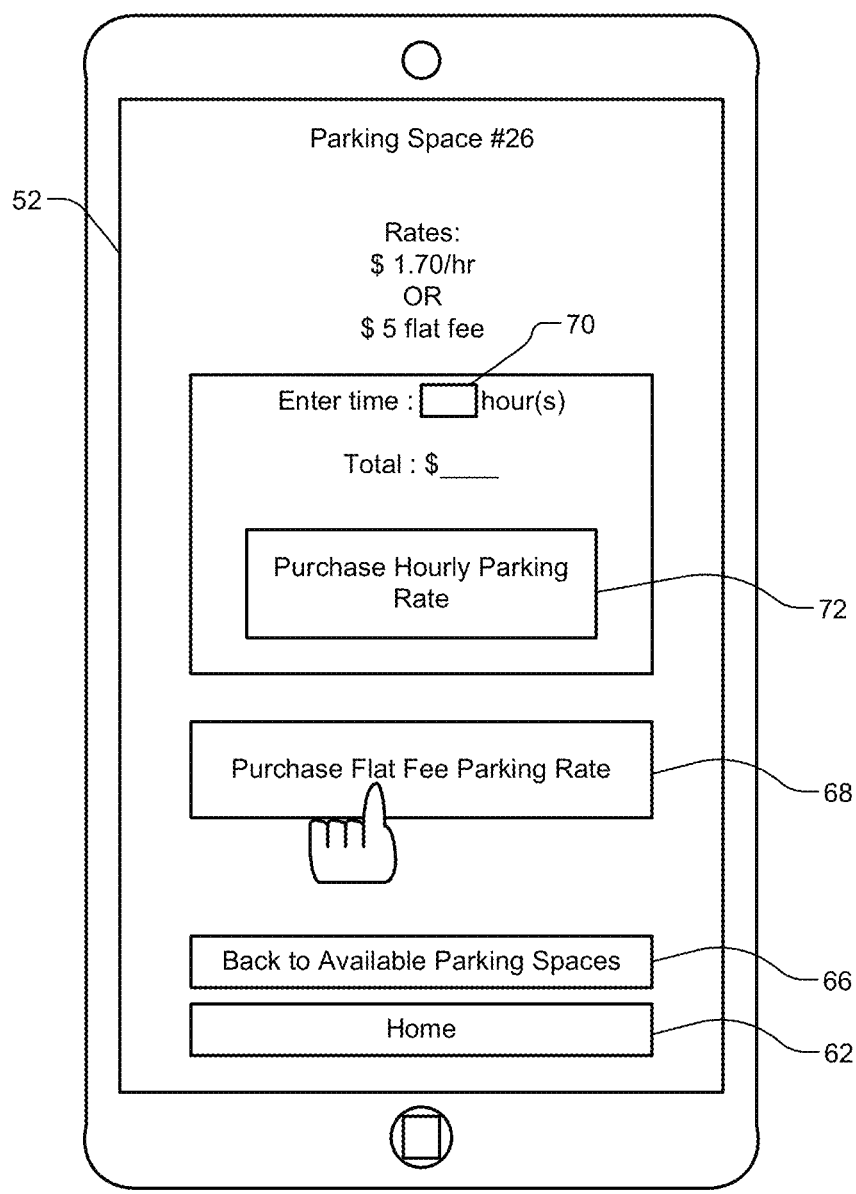

With reference to FIG. 4F, an example embodiment of the purchase app state is shown on the display of the mobile device 50. The App may be set to the purchase app state when the operator selects a button corresponding to a parking space in the parking space selection app state as described in FIG. 4E. The purchase app state is configured to provide the operator the capability to purchase and/or select a parking space. Once the operator has made a purchase and/or selection, the purchasing app state may be configured to provide a message on the display 52 that communicates to the operator that the purchase has been confirmed by the App and then proceed to the next app state.

As shown in this example embodiment, if the operator of the mobile device and the vehicle is in the Subject Parking Deck, has selected section H, and has selected parking space #26, then the operator may be prompted with an option to purchase parking at an hourly rate or at a flat fee. The operator may choose the hourly rate option if the operator determines that the flat fee option would be more expensive based on the amount of time the operator intends to use the parking space.

If the operator chooses the hourly rate option, the operator may set the amount of time the operator intends to use the parking space by pressing button 70, which is configured to load a keyboard on the mobile device, thereby allowing the operator to input the amount of time desired. The purchasing app state may be configured to have a predefined set of intervals from which an operator can select the time. For example, the intervals may be one hour, half-hour, or quarter-hour intervals. Once the operator has specified the time interval, the total cost of the parking space may be automatically updated in the "Total" portion of the display so that the operator may view the cost of the hourly rate option based on the time input. If the operator is satisfied with this option, the operator may select the "Purchase Hourly Parking Rate" button 72 to purchase the spot. Subsequently, a message may appear on the display 52 that communicates to the operator that the purchase has been confirmed by the App.

If the operator desires the flat rate option, the operator may select a "Purchase Flat Fee Parking Rate" button 68. Subsequently, a message may appear on the display 52 that communicates to the operator that the purchase has been confirmed by the App.

If the parking space chosen by the operator is free, then the hourly rate options may be grayed out and disabled. As such, the display may communicate that the flat fee option for this space is $0 (i.e., free), and the operator may select the "Purchase Flat Fee Parking Rate" button 68. Subsequently, a message may appear on the display 52 that communicates to the operator that the purchase has been confirmed by the App.

After the message on the display 52 communicates to the operator that the purchase has been confirmed by the App, the App may proceed to a navigation app state, which is configured to provide instructions for the operator describing how to arrive to the purchased parking spot. The navigation app state may include a listing of text that provides step-by-step instructions describing how to arrive to the parking space. Additionally or alternatively, the navigation app state may provide an interactive map that provides a graphical representation of the step-by-step instructions describing how to arrive to the parking space. Furthermore, the navigation app state may be configured to, using a speaker of the mobile device 50, provide turn-by-turn voice navigation instructions directing the operator of the vehicle 10 to the parking space.

Alternatively, the parking section selection app state and the parking space selection app state may be bypassed, and the App may be configured to perform the operations in each of these steps automatically. The App may be configured to select a section and a parking space based on a variety of parameters, wherein the App is configured to optimize price, distance away from the building, etc. As an example, the App may be configured to select the cheapest parking selection and parking space available after it has scanned the parking lot. Once these selections are automatically made, the App may set itself to the purchase app state.

Figure 5A:
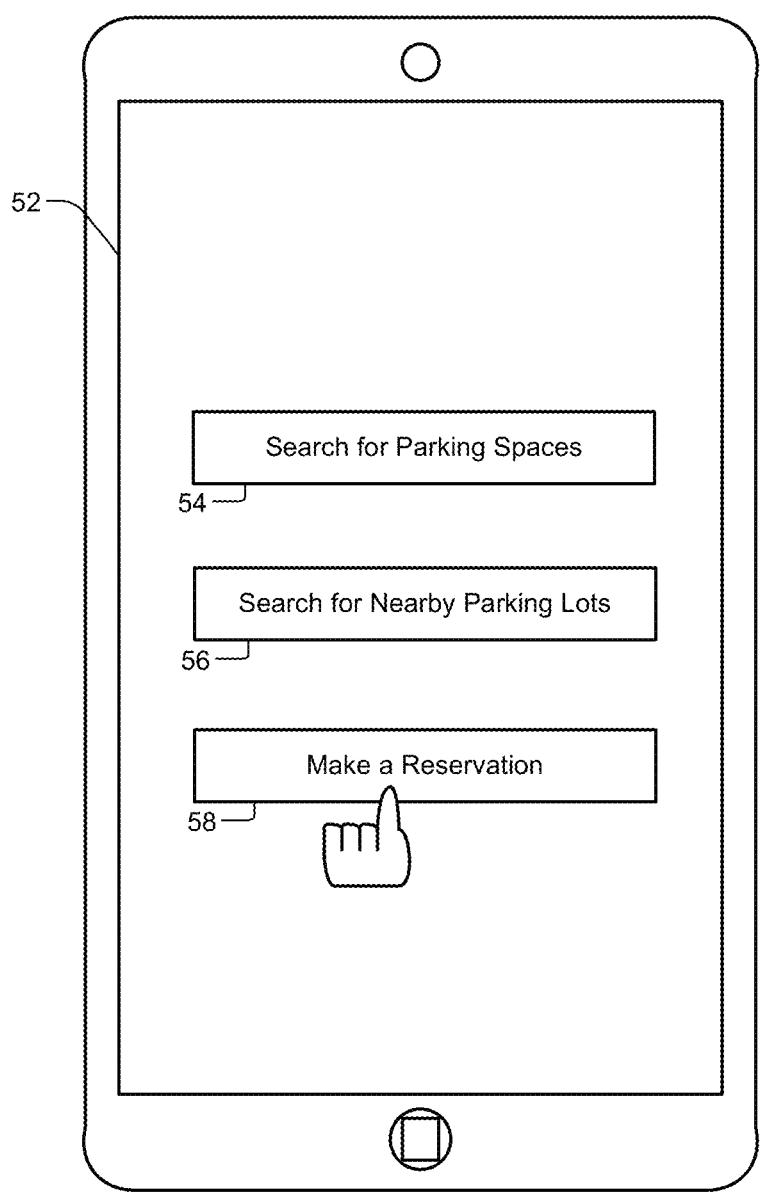

With reference to FIGS. 5A-5F, example embodiments of various application states of an App used to reserve a parking space are shown. With reference to FIG. 5A, an example embodiment of a default app state of an App that is used to select a parking space in a parking lot is shown. In this embodiment, the mobile device 50 is a smartphone. Alternatively, a laptop, PDA, or other device of the like may be used.

As described in FIG. 5A, the default app state of the App is shown on the display 52 of the mobile device 50. The App may be set to the default app state when the App is initialized by opening the App on the mobile device 50. The default app state is configured to provide an operator of the mobile device 50 the capability to search for parking spaces in a parking lot, to search for nearby parking lots, and to reserve a parking space in a parking lot. As an example, the default app state may provide a "Search for Parking Spaces" button 54, a "Search for Nearby Parking Lots" button 56, and a "Make a Reservation" button 58 on the display of the mobile device. Accordingly, once the operator selects the "Make a Reservation" button 58, as shown by a cartoon hand, the App is configured to set itself to the next app state corresponding to searching for parking lots.

Figure 5B:
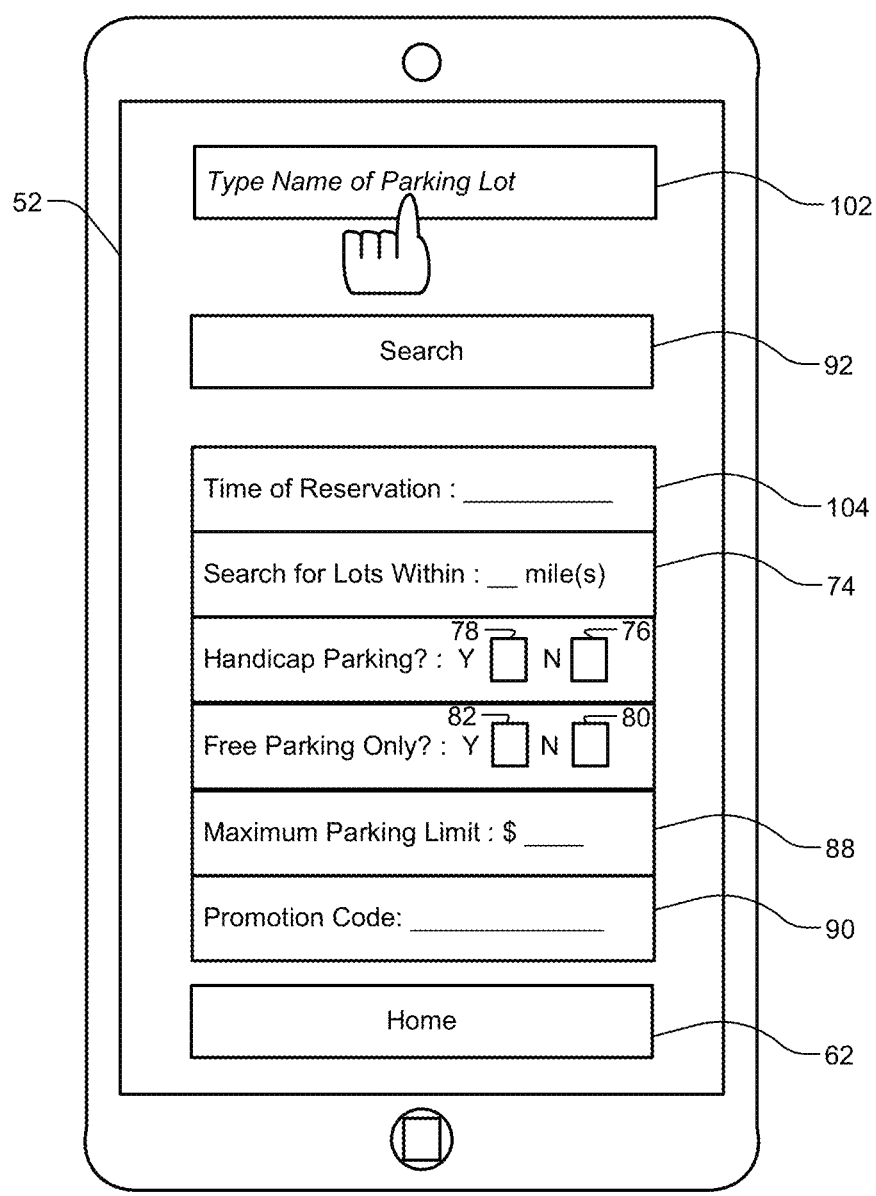

With reference to FIG. 5B, an example embodiment of a reservation queue app state is shown. In this embodiment, the reservation queue app state has the same functions and configurations of the queue app state described in FIG. 4B. However, the reservation queue app state may have an additional search bar 102 that is configured to allow the operator to manually input a name of the parking lot where the operator wishes to park. As such, the search bar 102 may have additional text included within the button signifying to the operator that he or she may perform a text queue of a parking lot. Once the operator selects the search bar 88, the reservation queue app state may be configured to load a keyboard on the mobile device 50, thereby allowing the operator to input the name of the desired parking lot. As an example, the operator may input the text "Subject Parking Deck" as the desired queue parameter. Once the name of the parking lot is inputted into the search bar 102, the operator may select the search button 92, which is configured to set the App state to the next state.

Additionally or alternatively, the reservation queue app state may include a button 104 that allows the operator to perform a queue based on a desired time. As an example, if the operator wishes to make a reservation from 6:00 PM-11:00 PM, then the operator may select button 104. Once the button is selected, a keyboard of the mobile device 50 may be loaded, and the operator may subsequently input the desired time for the queue.

With reference to FIG. 5C, an example embodiment of a reservation queue results app state is shown. Once the operator has selected the search button 92 in the reservation queue app state, the App is configured to proceed to the reservation queue results app state. The reservation queue results app state may be configured to allow the mobile device 50 to search a table stored within the server and display the parking lots with characteristics that match the queue parameters from the reservation queue app state. The available parking lots may be displayed such that the parking lots that match more of the queue parameters are displayed at the top of the screen, and the remaining parking lots are displayed based on the number of queue parameter matches. As an example, if the operator queues parking lots within 1 mile of the operator's location, does not want handicap parking, does not want free parking only, is willing to pay $10 for parking, and does not have a promotion code, the queue results app state will display those parking lots that match all the above criteria first, and then it may next display the parking lots that match four of the five queue parameters, etc.

If the operator enters queue parameters in the reservation queue app state that do not match any of the parking lot characteristics, then the reservation queue results app state may be configured to display a message that states "No results found, please repeat your search," etc. Furthermore, the App may be configured to return from the reservation queue results app state to the reservation queue app state in order to repeat the search.

If the operator manually inputs the name of the parking lot in the search bar 102 as described in FIG. 5B, the reservation queue results app state may be configured to display the names of the parking lots matching the name of the input. The inputs that closely match the name of a parking lot may be placed at a top of the display 52, while those inputs that do not match the name of a parking lot may not be displayed or are displayed at the bottom of the display 52. In this example embodiment, since the operator inserted a queue parameter in the search bar that matches the name of a parking lot recognized by the server as being equipped with the parking system, the reservation queue results app state may be configured to only display the name of the queued parking lot in the reservation queue app state.

If the operator wishes to repeat the queue, the operator may select a "Back to Search" button 96 in order to repeat the queue. Alternatively, if the operator desires to return to the default app state, the operator may select a "Home" button 62 that is configured to set the App to the default app state.

With reference to FIG. 5D, an example embodiment of the section selection app state is shown on the display 52 of the mobile device 50. The App may be set to the section selection app state when the operator selects a parking lot from the list of parking lots in the reservation queue results app state as described in FIG. 5C. Alternatively, the reservation queue results app state may be bypassed if only one parking lot matches the queue parameters set forth in the reservation queue app state.

The section selection app state is configured to provide an operator the capability to select a section of parking spaces for parking a vehicle. Once the operator selects a parking lot in the queue results app state, the section selection app state may be configured to display the various parking sections of the parking lot. Although FIG. 5D is merely shown for illustration purposes and may not necessarily reflect the various parking sections located within the Subject Parking Deck, as shown in the figure, the Subject Parking Deck may be divided into sections A-V.

Furthermore, the section selection app state may be configured to display which parking sections are unavailable and/or at maximum capacity. As an example, the section selection app state may gray out and disable the buttons corresponding to the parking sections that are unavailable and/or at maximum capacity. As shown in FIG. 5D, sections F, I, and K-V are grayed out and are disabled as a result of the sections being unavailable and/or at maximum capacity.

Additionally or alternatively, the section selection app state may be configured to alter the display of the various buttons corresponding to the parking sections based on a variety of factors. As an example, the section selection app state may be configured to set a button to a different color and/or shape if there are only handicap parking spaces in the section, there are only parking spaces that require a payment, or there are free parking spaces available within the section, etc.

As shown in this example embodiment, based on the unavailability of sections F, I, and K-V, the operator of the mobile device 50 has selected button 60 corresponding to section H of the Subject Parking Deck. If the operator wishes to search for parking spaces in a different parking lot, the operator may select a "Back to Available Parking Lots" button 98 that is configured to set the App to the reservation queue results app state. Alternatively, if the operator desires to return to the default app state, the operator may select the "Home" button 62 that is configured to set the App to the default app state.

Figure 5E:
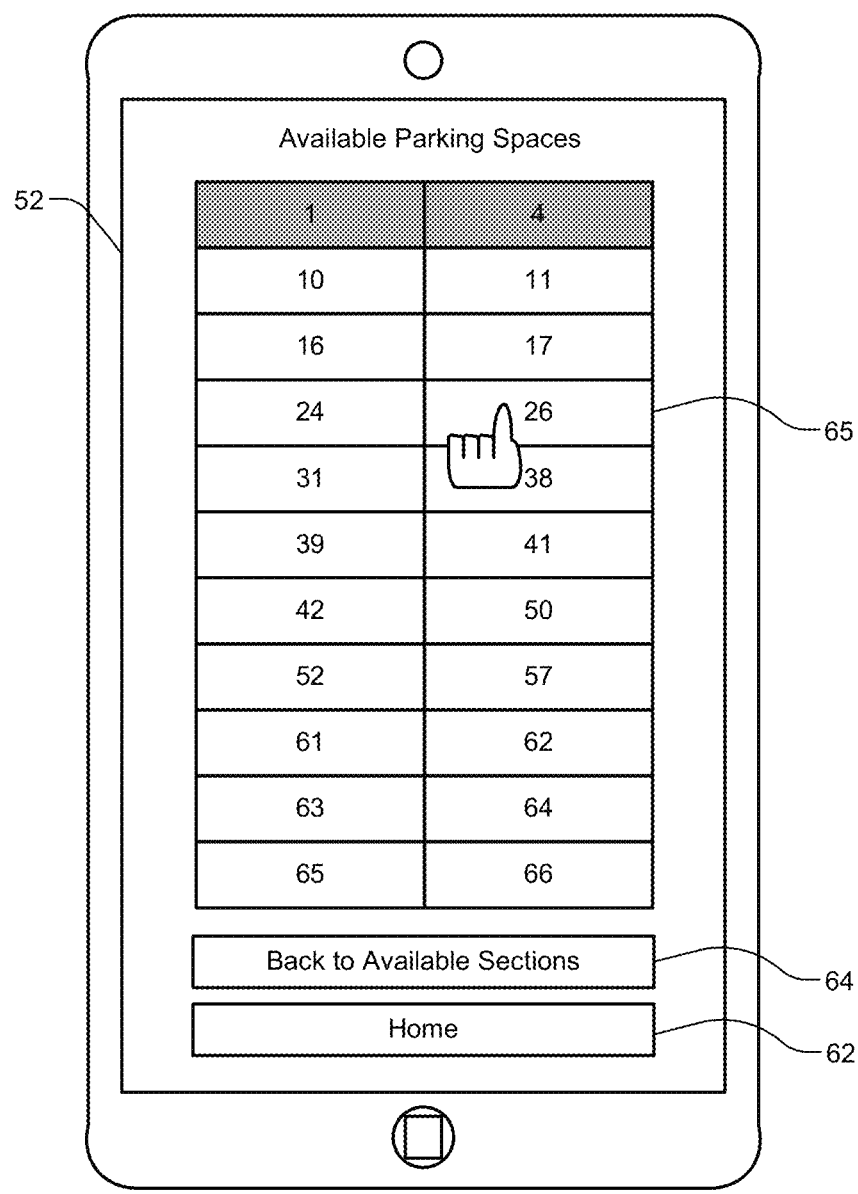

With reference to FIG. 5E, an example embodiment of the parking space selection app state is shown on the display of the mobile device 50. The App may be set to the parking space selection app state when the operator selects a button corresponding to a section with available parking spaces in the section selection app state as described in FIG. 5D. The parking space selection app state is configured to provide an operator the capability to select a parking space within a section for parking a vehicle. Alternatively, the App may be configured to bypass the section selection app state once the operator selects the parking lot from the reservation queue results app state if the parking lot is not divided into sections.

As an example, if the operator of the mobile device 50 and the vehicle is in the Subject Parking Deck and has selected section H, the parking space selection app state may provide a list of available parking spaces in section H. While only the available spaces in this section are shown in this embodiment, alternatively, all parking spaces within the chosen section may be shown, and those parking spaces that are unavailable may be grayed out as described above. As shown in this embodiment, parking spaces #1 and #4 are unavailable and are therefore grayed out and disabled. Additionally or alternatively, the display of the various buttons may have different colors and/or shape to represent, for example, handicap spaces and pricing options.

As shown in this example embodiment, the operator of the mobile device and the vehicle has selected button 65 corresponding to parking space #26. Alternatively, if operator desires to return to the section selection app state in order to select a new section, the operator may select the "Back to Available Sections" button 64. If the operator desires to return to the default app state, the operator may select the "Home" button 62 that is configured to set the App to the default app state.

Figure 5F:
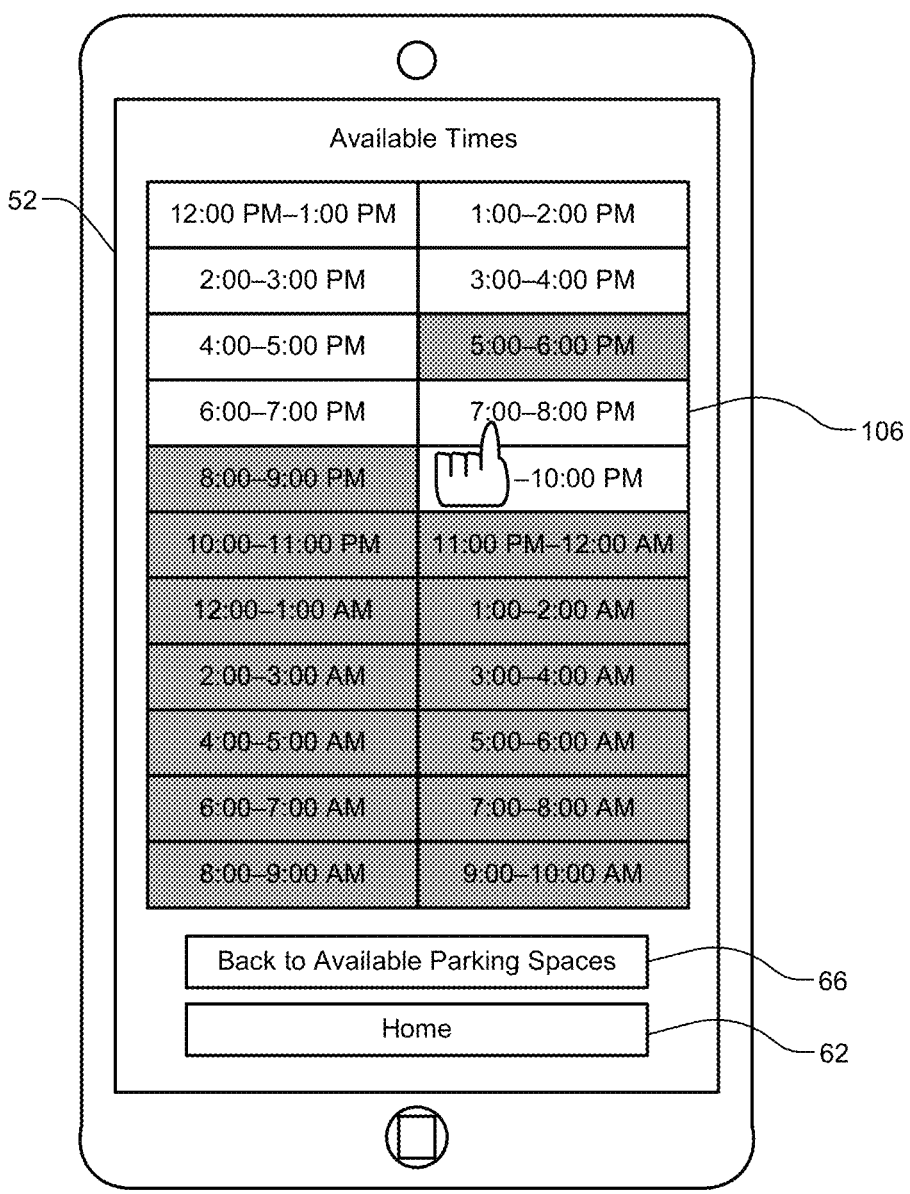

With reference to FIG. 5F, an example embodiment of a reservation time selection app state is shown. The App may be set to the reservation time selection app state when the operator selects button 65 corresponding to an available parking space in the parking space selection app state as described in FIG. 5E. The reservation time selection app state is configured to provide an operator the capability to select a time slot for parking the vehicle in a parking space.

As an example, if the operator of the mobile device 50 has selected the Subject Parking Deck, has selected section H, and has selected parking space #26, then the reservation time selection app state may provide a list of available time slots for the operator to select. While in this embodiment only one time slot is being selected by the operator, the reservation time selection app state may be configured to allow the operator to select more than one time slot. Additionally, all time slots within the chosen parking space may be shown, and those time slots that are unavailable may be grayed out and disabled as a result of being unavailable or already having been booked by another operator. As shown in this embodiment, the available time slots are from 12:00 PM-5:00 PM, 6:00 PM-8:00 PM, and 9:00 PM-10:00 PM. Additionally or alternatively, the display of the various buttons may have different colors and/or shape to represent, for example, pricing options or promotions for the corresponding time slot.

As shown in this embodiment, the operator selects a button 106 corresponding to the time slot between 7:00 PM-8:00 PM. Alternatively, if operator desires to return to the parking space selection app state in order to select a new parking space, the operator may select the "Back to Available Spaces" button 66. If the operator desires to return to the default app state, the operator may select the "Home" button 62 that is configured to set the App to the default app state.

Figure 5G:
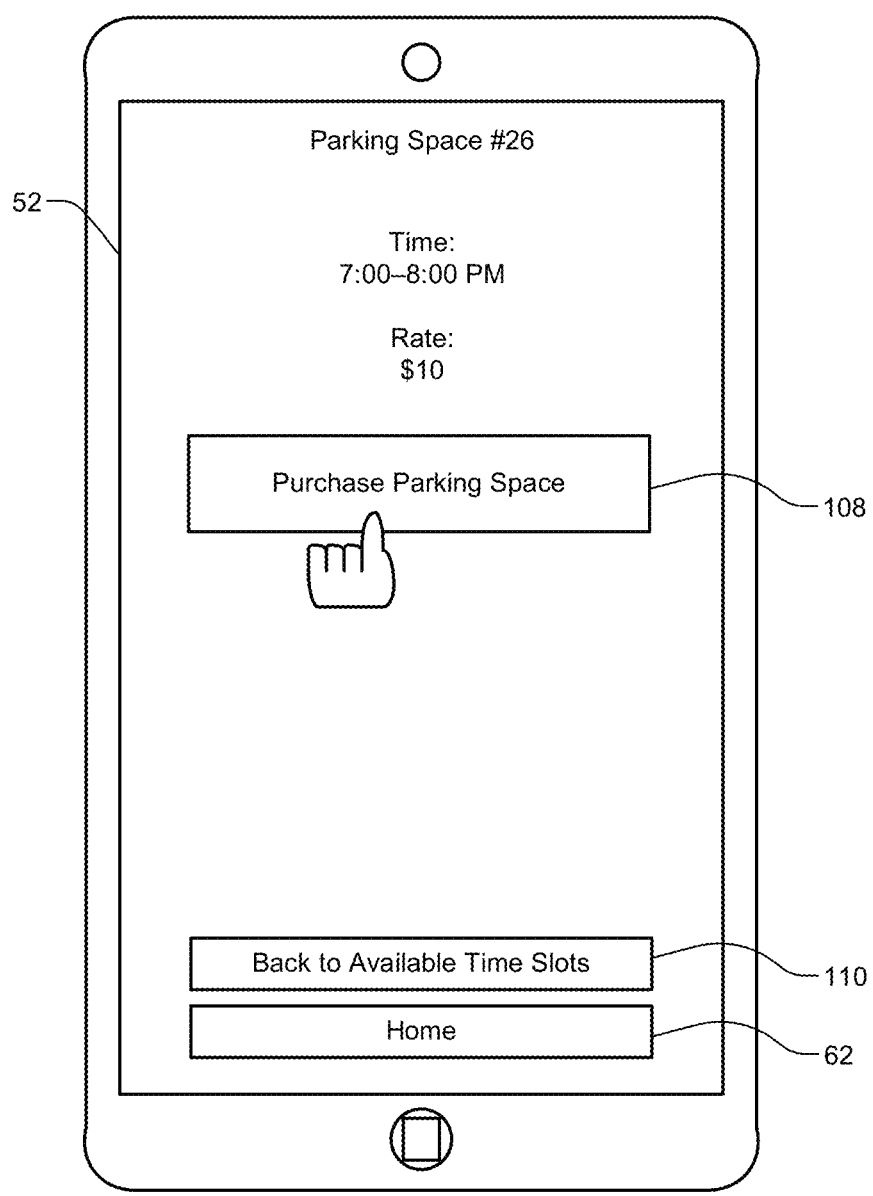

With reference to FIG. 5G, an example embodiment of the purchase app state is shown. The App may be set to the purchase app state when the operator selects a button corresponding to a parking space in the parking space selection app state as described in FIG. 5F. The purchase app state is configured to provide the operator the capability to purchase a parking space. Once the operator has made a purchase, the purchasing app state may be configured to provide a message on the display that communicates that the purchase has been confirmed by the App and then proceed to the next app state.

As shown in this example embodiment, if the operator of the mobile device 50 has selected the Subject Parking Deck, has selected section H, has selected parking space #26, and has reserved the parking space from 7:00 PM-8:00 PM, then the operator may be prompted with an option to purchase parking at a flat fee. The hourly rate option may not be included in this embodiment since the time slot has already been defined.

If the parking space and time slot chosen by the operator is free, then the operator may be instructed to purchase the parking space at a rate of $0 (i.e., free). As such, the operator may select a "Purchase Parking Space" button 108. Subsequently, a message may appear on the display 52 that communicates to the operator that the purchase has been confirmed by the App.

After the message appears on the display 52 that communicates to the operator that the purchase has been confirmed by the App, the App may proceed to the navigation app state, which is configured to provide instructions for the operator describing how to arrive to the purchased parking spot. The navigation app state may include a listing of text that provides step-by-step instructions describing how to arrive to the parking space. Additionally or alternatively, the navigation app state may provide an interactive map that provides a graphical representation of the step-by-step instructions describing how to arrive to the parking space.

Alternatively, the parking section selection app state and the parking space selection app state may be bypassed, and the App may be configured to perform the operations in each of these steps automatically. The App may be configured to select a section and a parking space based on a variety of parameters, wherein the App is configured to optimize price, distance away from the building, etc. As an example, the App may be configured to select the cheapest parking selection and parking space available after it has scanned the parking lot. Once these selections are automatically made, the App may set itself to the purchase app state.

FIG. 6 is a control algorithm showing an example implementation of the method of selecting a parking space using the parking lot system. The control algorithm may be performed, for example, by the mobile device 50 and the communication system 20 of the vehicle 10 and starts at 604. At 608, the operator may open the App of the mobile device 50 by selecting an icon on the display 52 of the mobile device 50 corresponding to the App. At 612, the mobile device 50, using the App, determines whether the operator is either making a reservation or searching for nearby parking lots. If so, the algorithm transfers to 616; otherwise, the algorithm transfers to 628. The App may make this determination depending on which button is selected at the default app state of the App. Specifically, if the operator selects the "Search for Parking Spaces" button 54, then the algorithm will transfer to 628. Otherwise, if the operator selects the "Search for Nearby Parking Lots" button 56 or the "Make a Reservation" button 58, then the algorithm transfers to 616.

At 628, the mobile device 50, using the App, determines whether the vehicle 10 and the mobile device 50 are located in a parking lot equipped with the parking system. To perform step 628, the App may be configured to compare the GPS coordinates of the mobile device 50 and the vehicle 10 to GPS coordinates of parking lots equipped with the system. To perform the comparison, the mobile device 50 may retrieve data from a table in the server 40 that comprises the name of all the parking lots equipped with the parking system and a corresponding GPS location of the parking lot. If the mobile device 50 is able to match its GPS coordinates to one of the parking lots in the table of the server 40, then the control algorithm may transfer to 640; otherwise, the algorithm transfers to 632.

At 632, if the mobile device 50, using the App, determines the vehicle 10 and the mobile device 50 are not located in a parking lot equipped with the parking system, the App may be configured to display a message stating that no parking lot was detected. The algorithm may then end at 684.

At 616, in response to a variety of queue parameters inputted by the operator at either the reservation queue app state or the queue app state, the mobile device 50, using the App, is configured to queue the parking lots stored in the server based on the queue parameters. At 620, the mobile device 50 determines whether a parking lot matching the queue parameters is found. To perform step 620, the mobile device 50 may be configured to compare the queue parameters of the operator to the parameters of the plurality of parking lots stored in the table of the server. If the queue parameters match any one of the plurality of parking lots, then the algorithm transfers to 624; otherwise, if no parking lots are found on the server that match the queue parameters of the queue, the algorithm transfers to 622. At 622, the mobile device 50 communicates to the operator that no parking lot was found matching the queue parameters. The algorithm then returns to 616 and the App of the mobile device resets itself to the reservation queue or queue app state.

Similar to 620, at 624, the mobile device 50 determines whether more than one parking lot matching the queue parameters is found. If so, the algorithm transfers to 636; otherwise, the algorithm transfers to 640. At 636, the App is configured to instruct the operator of the mobile device 50 to select a parking lot from the plurality of parking lots generated in the queue. The algorithm then transfers to 640.

At 640, the desired parking lot selected by the operator is scanned. The scan may be performed by, for example: the communication system 20 of the vehicle 10 communicating with the plurality of beacons 30 and the other vehicles in the parking lot when the operator is located in the parking lot; the plurality of beacons 30 communicating with the communication systems of the parked vehicles; or the mobile device 50 communicating with the server 40, wherein the App of the mobile device 50 parses through the table of the server 40 to determine whether the geospatial reference location data of the parking spaces matches geospatial location data of a parked vehicle.

At 644, the algorithm determines whether there are parking spaces available in the parking lot. If so, the algorithm transfers to 648; otherwise, the algorithm transfers to 672. At 648, the mobile device 50, using the App, displays the available parking spaces. At 652, the operator selects an available parking space on the mobile device 50. Further, if the operator is making a reservation, the operator at 652 may also select a time slot for parking the vehicle. At 656, the algorithm determines whether the operator has confirmed the purchase or selection. If so, the algorithm transfers to 664; otherwise, the algorithm transfers to 660. At 660, the algorithm determines whether the operator desires to return to a previous app state and select a new parking space. If so, the algorithm returns to 648; otherwise, the algorithm returns to 656.

At 664, once the operator has confirmed the purchase or selection at 656, the mobile device 50 is configured to provide a confirmation of the operator's purchase or selection of the parking space. At 668, the App of the mobile device is configured to set itself to the navigation app state and guide the operator of the vehicle 10 to the purchased or selected parking spot. The algorithm then transfers to 684 and ends.

At 672, the mobile device 50, using the App, is configured to display a message stating that no parking spaces are available in response to the algorithm at step 644 determining that no parking spaces are available. At 676, the algorithm determines whether the operator selected the current lot from a list of multiple lots. If so, the algorithm transfers to 680; otherwise, the algorithm transfers to 684 and ends. At 680, the mobile device 50, using the App, is configured to prompt the operator to select a new parking lot from the multiple parking lots generated in the queue. The control algorithm then returns to 636.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions above, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
  a communication system in a vehicle, the communication system including a global positioning system (GPS) receiver configured to receive OPS signals from a plurality of OPS satellites and an ultra-wide band (UWB) transceiver system configured to receive UWB signals from a plurality of UWB beacons, each UWB beacon being located at a respective fixed reference location within a parking area, the communication system being configured to determine geospatial location data of the vehicle including a GPS position of the vehicle based on the GPS signals received from the plurality of GPS satellites and a UWB position of the vehicle based on the UWB signals received from the plurality of UWB beacons and to transmit the geospatial location data of the vehicle to a server, the server being configured to receive the geospatial location data for a plurality of other vehicles parked within the parking area and to compare the geospatial location data for each of the other vehicles with geospatial reference location data for a plurality of parking spaces in the parking area to determine at least one available parking space location corresponding to at least one available parking space within the parking area;
  a mobile device in communication with the server and in communication with the communication system in the vehicle, the mobile device being configured to (i) receive the GPS signals from the plurality of GPS satellites, (ii) determine a GPS location of the mobile device based on the GPS signals, (iii) communicate the OPS location of the mobile device to the server, (iv) receive a response from the server, having received the geospatial location data of the vehicle, indicating whether the mobile device is located within the parking area equipped with the plurality of UWB beacons based on the GPS location of the mobile device and indicating the at least one available parking space location corresponding to the at least one available parking space within the parking area when the mobile device is located within the parking area equipped with the plurality of UWB beacons, (v) receive the UWB position of the vehicle from the communication system, and (vi) generate output to guide an operator of the vehicle to the at least one available parking space location based on the UWB position of the vehicle received from the communication system and based on the at least one available parking space location received from the server.

2. The system of claim 1, wherein the UWB transceiver comprises a control module, an ultra-wide band radio, an antenna, and a receiver module.

3. The system of claim 1, wherein the plurality of UWB beacons each include an ultra-wide band transceiver configured to transmit the respective fixed reference location.

4. The system of claim 1, wherein the mobile device is configured to, using a mobile application, reserve available parking spaces in the parking area through communication with the server.

5. The system of claim 1, wherein the output includes turn-by-turn voice navigation instructions to guide the operator of the vehicle to the at least one available parking space.

6. The system of claim 1, wherein the mobile device receives payment information to pay a fee for the at least one available parking space and communicates the payment information to the server.

7. A method comprising:
  determining, with a communication system in a vehicle, geospatial location data of the vehicle, the communication system including a global positioning system (GPS) receiver configured to receive GPS signals from a plurality of GPS satellites and an ultra-wide band (UWB) transceiver system configured to receive UWB signals from a plurality of UWB beacons, each UWB beacon being located at a respective fixed reference location within a parking area, the geospatial location data of the vehicle including a GPS position of the vehicle based on the GPS signals received from the plurality of GPS satellites and a UWB position of the vehicle based on the UWB signals received from the plurality of UWB beacons;
  transmitting, with the communication system, the geospatial location data of the vehicle to a server, the server being configured to receive the geospatial location data for a plurality of other vehicles parked within the parking area and to compare the geospatial location data for each of the other vehicles with geospatial reference location data for a plurality of parking spaces in the parking area to determine at least one available parking space location corresponding to at least one available parking space within the parking area;

receiving, with a mobile device in communication with the server and in communication with the communication system in the vehicle, the GPS signals from the plurality of GPS satellites;

determining, with the mobile device, a GPS location of the mobile device based on the GPS signals;

communicating, with the mobile device, the GPS location of the mobile device to the server;

receiving, with the mobile device, a response from the server, having received the geospatial location data of the vehicle, indicating whether the mobile device is located within the parking area equipped with the plurality of UWB beacons based on the OPS location of the mobile device and indicating the at least one available parking space location corresponding to the at least one available parking space within the parking area when the mobile device is located within the parking area equipped with the plurality of UWB beacons;

receiving, with the mobile device, the UWB position of the vehicle from the communication system; and generating, with the mobile device, output to guide an operator of the vehicle to the at least one available parking space location based on the UWB position of the vehicle received from the communication system and based on the at least one available parking space location received from the server.

8. The method of claim 7, wherein the output includes turn-by-turn voice navigation instructions.

9. The method of claim 7, wherein determining the geospatial location data of the vehicle includes performing at least one of triangulation, trilateration, or triangulateration.

10. The method of claim 7, further comprising:
receiving, with the mobile device, input to reserve the at least one available parking space within the parking area; and
communicating, with the mobile device, data indicating that the at least one available parking space has been reserved.

11. The method of claim 7, further comprising:
receiving, with the mobile device, payment information to pay a fee for the at least one available parking space; and
communicating, with the mobile device, the payment information to the server.

* * * * *

UNITED STATES PATENT AND TRADEMARK OFFICE
CERTIFICATE OF CORRECTION

PATENT NO. : 10,713,642 B2  
APPLICATION NO. : 15/229411  
DATED : July 14, 2020  
INVENTOR(S) : Patrick Powell Page 1 of 1

It is certified that error appears in the above-identified patent and that said Letters Patent is hereby corrected as shown below:

On the Title Page

Column 2, Item (57) Abstract, Line 13: Delete "(communicate" and insert --communicate-- therefor In the Claims Column 19, Line 50: In Claim 1, delete "OPS" and insert --GPS-- therefor Column 19, Line 51: In Claim 1, delete "OPS" and insert --GPS-- therefor Column 20, Line 3: In Claim 1, after "area;", insert --and--

Column 20, Line 10: In Claim 1, delete "OPS" and insert --GPS-- therefor

Column 21, Line 15: In Claim 7, delete "OPS" and insert --GPS-- therefor

Signed and Sealed this  
Twenty-second Day of September, 2020

Andrei Iancu  
*Director of the United States Patent and Trademark Office*